United States Patent
Rothschild

(10) Patent No.: US 11,681,068 B2
(45) Date of Patent: Jun. 20, 2023

(54) X-RAY IMAGING APPARATUS AND METHOD

(71) Applicant: Viken Detection Corporation, Burlington, MA (US)

(72) Inventor: Peter J. Rothschild, Newton, MA (US)

(73) Assignee: Viken Detection Corporation, Burlington, MA (US)

(*) Notice: Subject to any disclaimer, the term of this patent is extended or adjusted under 35 U.S.C. 154(b) by 0 days.

(21) Appl. No.: 17/336,187

(22) Filed: Jun. 1, 2021

(65) Prior Publication Data

US 2022/0003693 A1 Jan. 6, 2022

Related U.S. Application Data

(60) Provisional application No. 63/033,519, filed on Jun. 2, 2020.

(51) Int. Cl.
*G01N 23/04* (2018.01)
*G01N 23/20008* (2018.01)
(Continued)

(52) U.S. Cl.
CPC .......... *G01V 5/0025* (2013.01); *G01N 23/04* (2013.01); *G01N 23/203* (2013.01);
(Continued)

(58) Field of Classification Search
None
See application file for complete search history.

(56) References Cited

U.S. PATENT DOCUMENTS 4,031,401 A 6/1977 Jacob
4,242,583 A 12/1980 Annis et al.
(Continued)

FOREIGN PATENT DOCUMENTS

CN 201340400 Y 11/2009
CN 107209282 A 9/2017
(Continued)

OTHER PUBLICATIONS

Case, G. L., et al., "Wavelength-Shifting Fiber Readout of LaCl and LaBr scintillators," Proc. of SPIE, UV, X-Ray, and gamma-Ray Space Instrumentation for Astronomy XIV, 58980K; vol. 5898, 8 pages (2005).
Hutchinson, D. P., et al., "Optical readout for Imaging Neutron Scintillation Detectors," Proc. of SPIE; vol. 4785; 262-267 (2002).
Keizer, F., "The Optimal Cosmic Ray Detector for High-Schools," HiSparc Collaboration, 2011.
(Continued)

*Primary Examiner* — Thomas R Artman
(74) *Attorney, Agent, or Firm* — Sunstein LLP

(57) ABSTRACT

An x-ray imaging apparatus includes an x-ray source module configured to output source x-rays, a pencil-beam-forming module having input and output ports, and a module engagement interface that enables a user to select aligned and non-aligned configurations of the source and pencil-beam-forming modules. In the aligned configuration, the pencil-beam-forming module is aligned with the source module to receive source x-rays at the input port and to output a scanning pencil beam through the output port toward a target. In the non-aligned configuration, the pencil-beam-forming module is not aligned with the x-ray source module to receive the source x-rays nor to output the pencil beam, but instead enables the source x-rays to form a stationary, wide-area beam directed toward the target. Example embodiments can be handheld, can enable both backscatter imaging and high-resolution transmission imaging using the same apparatus, and can be employed in finding and disarming explosive devices.

23 Claims, 13 Drawing Sheets

(51) Int. Cl.
   *G01N 23/203* (2006.01)
   *G01V 5/00* (2006.01)
   *G01N 23/10* (2018.01)

(52) U.S. Cl.
   CPC ....... *G01N 23/20008* (2013.01); *G01N 23/10* (2013.01); *G01N 2223/045* (2013.01); *G01N 2223/053* (2013.01); *G01N 2223/1016* (2013.01); *G01N 2223/301* (2013.01); *G01N 2223/308* (2013.01); *G01N 2223/316* (2013.01); *G01N 2223/3301* (2013.01); *G01N 2223/40* (2013.01); *G01N 2223/639* (2013.01)

(56) References Cited

U.S. PATENT DOCUMENTS

| | | | |
|---|---|---|---|
| 4,260,898 A | 4/1981 | Annis | |
| 4,315,146 A | 2/1982 | Rudin | |
| 4,342,914 A | 8/1982 | Bjorkholm | |
| 4,472,822 A | 9/1984 | Swift | |
| 4,503,332 A | 3/1985 | Annis | |
| 4,646,339 A | 2/1987 | Rice | |
| 4,799,247 A | 1/1989 | Annis et al. | |
| 4,809,312 A | 2/1989 | Annis | |
| 5,022,062 A | 6/1991 | Annis | |
| 5,103,099 A | 4/1992 | Bourdinaud et al. | |
| 5,179,581 A | 1/1993 | Annis | |
| 5,181,234 A | 1/1993 | Smith | |
| 5,224,144 A | 6/1993 | Annis | |
| 5,391,878 A | 2/1995 | Petroff | |
| 5,666,393 A | 9/1997 | Annis | |
| 5,692,028 A | 11/1997 | Geus et al. | |
| 5,764,683 A | 6/1998 | Swift et al. | |
| 5,783,829 A | 6/1998 | Sealock | |
| 5,903,623 A | 5/1999 | Swift et al. | |
| 6,078,052 A | 6/2000 | DiFilippo | |
| 6,192,104 B1 | 2/2001 | Adams et al. | |
| 6,252,929 B1 | 6/2001 | Swift et al. | |
| 6,272,206 B1* | 8/2001 | Bjorkholm | G01N 23/04 378/146 |
| 6,292,533 B1 | 9/2001 | Swift et al. | |
| 6,434,219 B1 | 8/2002 | Rothschild et al. | |
| 6,461,040 B1 | 10/2002 | Mattson et al. | |
| 6,525,320 B1 | 2/2003 | Juni | |
| 7,099,434 B2 | 8/2006 | Adams et al. | |
| 7,115,875 B1 | 10/2006 | Worstell | |
| 7,200,201 B2* | 4/2007 | Unger | A61B 6/06 378/150 |
| 7,218,704 B1 | 5/2007 | Adams et al. | |
| 7,286,636 B2* | 10/2007 | Unger | G01N 23/04 378/150 |
| 7,310,407 B2 | 12/2007 | Juni | |
| 7,593,510 B2 | 9/2009 | Rothschild | |
| 7,995,707 B2 | 8/2011 | Rothschild et al. | |
| D724,716 S | 3/2015 | Guo | |
| 9,146,201 B2 | 9/2015 | Schubert et al. | |
| 9,285,488 B2 | 3/2016 | Arodzero et al. | |
| 10,739,491 B2* | 8/2020 | Yang | G01N 23/20 |
| 10,762,998 B2 | 9/2020 | Rothschild | |
| 10,762,999 B2 | 9/2020 | Kaszuba et al. | |
| 10,770,195 B2 | 9/2020 | Rothschild | |
| 10,794,843 B2 | 10/2020 | Rothschild et al. | |
| 10,959,689 B2* | 3/2021 | Nariyuki | A61B 6/40 |
| 11,200,998 B2 | 12/2021 | Rothschild | |
| 2001/0016028 A1 | 8/2001 | Adams et al. | |
| 2004/0017888 A1 | 1/2004 | Seppi et al. | |
| 2006/0083354 A1 | 4/2006 | Tybinkowski et al. | |
| 2006/0104415 A1* | 5/2006 | Unger | G01N 23/04 378/62 |
| 2006/0251214 A1* | 11/2006 | Unger | A61B 6/588 378/62 |
| 2008/0170661 A1* | 7/2008 | Unger | A61B 6/4291 378/62 |
| 2009/0086907 A1 | 4/2009 | Smith | |
| 2009/0103686 A1 | 4/2009 | Rothschild | |
| 2011/0058644 A1 | 3/2011 | Thran et al. | |
| 2011/0103548 A1 | 5/2011 | Bendahan | |
| 2012/0236990 A1 | 9/2012 | Rothschild | |
| 2012/0263276 A1 | 10/2012 | Schubert et al. | |
| 2013/0134930 A1 | 5/2013 | Konkle et al. | |
| 2013/0195248 A1 | 8/2013 | Rothschild et al. | |
| 2013/0202089 A1 | 8/2013 | Schubert et al. | |
| 2013/0208857 A1 | 8/2013 | Arodzero et al. | |
| 2013/0315368 A1 | 11/2013 | Turner | |
| 2016/0070006 A1 | 3/2016 | Konkle et al. | |
| 2017/0052125 A1 | 2/2017 | Georgeson et al. | |
| 2017/0332986 A1 | 11/2017 | Grondin et al. | |
| 2017/0358380 A1 | 12/2017 | Rothschild | |
| 2018/0294066 A1 | 10/2018 | Rothschild | |
| 2019/0043633 A2 | 2/2019 | Rothschild | |
| 2019/0242834 A1 | 8/2019 | Rothschild et al. | |
| 2019/0346382 A1 | 11/2019 | Rothschild | |
| 2019/0380664 A1* | 12/2019 | Nariyuki | A61B 6/08 |
| 2020/0025968 A1* | 1/2020 | Yang | G21K 1/04 |
| 2020/0326291 A1 | 10/2020 | Rothschild et al. | |
| 2021/0005340 A1 | 1/2021 | Rothschild | |
| 2021/0074445 A1 | 3/2021 | Rothschild | |
| 2022/0003693 A1* | 1/2022 | Rothschild | G01V 5/0016 |
| 2022/0091054 A1* | 3/2022 | Rothschild | G01V 5/0025 |

FOREIGN PATENT DOCUMENTS

| | | | |
|---|---|---|---|
| CN | 108 318 512 A | 7/2018 | |
| CN | 108318512 A * | 7/2018 | G01N 23/02 |
| EP | 2667184 | 11/2013 | |
| EP | 3 505 975 A1 | 7/2019 | |
| GB | 2084829 | 4/1982 | |
| WO | 01/37287 A1 | 5/2001 | |
| WO | WO 2005/079437 | 9/2005 | |
| WO | WO 2011/053972 | 5/2011 | |
| WO | WO 2012/058207 | 5/2012 | |
| WO | WO 2012/174265 | 12/2012 | |
| WO | WO 2014/058495 | 4/2014 | |
| WO | WO 2016/081881 | 5/2016 | |
| WO | WO 2019/152900 | 8/2019 | |
| WO | WO 2019/217596 | 11/2019 | |
| WO | 2021/247615 A1 | 12/2021 | |

OTHER PUBLICATIONS

Maekawa, T., et al., "Thin Beta-ray Detectors using Plastic Scintillator Combined with Wavelength-shifting Fibers for Surface Contamination Monitoring," Journal of Nuclear Science and Technology, vol. 35: No. 12; pp. 886-894 (1998).

MINI Z Handheld Z Backscatter Screening System Ovendew, Civil Action No. 1:19-cv-10614-NMG, Filed Apr. 29, 2019 (18 pages).

Nishikido, F., et al., "X-ray Detector made of Plastic Scintillators and WLS fiber for real-time dose Distribution Monitoring in Interventional Radiology," IEEE Nuclear Science Symposium and Medical Imaging Conference (NSS/MIC), pp. 1272-1274 (2012).

Stein, J. A. and Swift, R. D. "Flying Spot X-Ray Imaging Systems," Materials Evaluation, vol. 30; No. 7; 137-148 (1972).

Van Liew, S., "New Developments in Portable Backscatter Systems"; Civil Action No. 1:19-cv-10614-NMG, Filed Apr. 29, 2019 (43 pages).

Worstell, W., et al., "Scintillator Crystal Readout with Wavelength-Shifting Optical Fibers," IEEE, pp. 1869-1873 (1995).

Defendants' Opposition to Plaintiffs Motion for Preliminary Injunction, Civil Action No. 19-cv-10614-NMG, 121 pages, Filed Ap. 29, 2019.

Plaintiffs Motion for Temporary Restraining Order and Preliminary Injunction, Civil Action No. 1:19-cv-10614-NMG, 3 pages, Filed Apr. 16, 2019.

Reply in Support of Plaintiff's Motion for Preliminary Injunction, Civil Action No. 1:19-cv-10614-NMG, 8 pages, Filed May 28, 2019.

Supplemental Brief in Support of Plaintiff's Motion for Preliminary Injunction, Civil Action No. 1:19-cv-10614-NMG, 5 pages, Filed Jun. 12, 2019.

(56) References Cited

OTHER PUBLICATIONS

Affidavit of Paul Bradshaw, Civil Action No. 1:19-cv-10614-NMG, Filed Apr. 29, 2019 (7 pages).
Invitation to Pay Additional Fees and, Where Applicable, Protect Fee and Annex for International Application No. PCT/US2021/035306, entitled "X-Ray Imaging Apparatus and Method," dated Sep. 3, 2021.
PCT International Search Report and Written Opinion for International Application No. PCT/US2021/035306, entitled "X-Ray Imaging Apparatus and Method," dated Oct. 25, 2021.

* cited by examiner

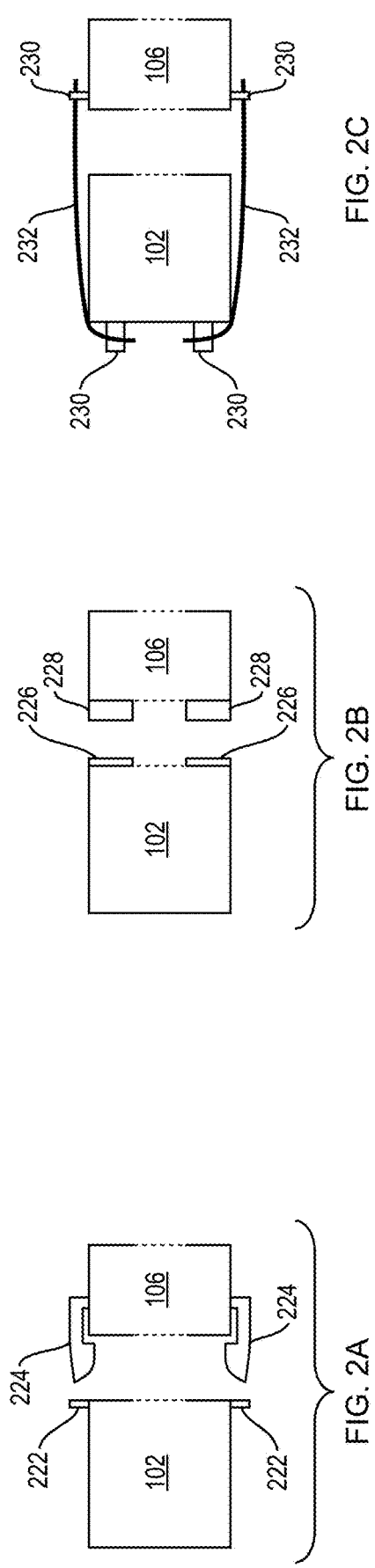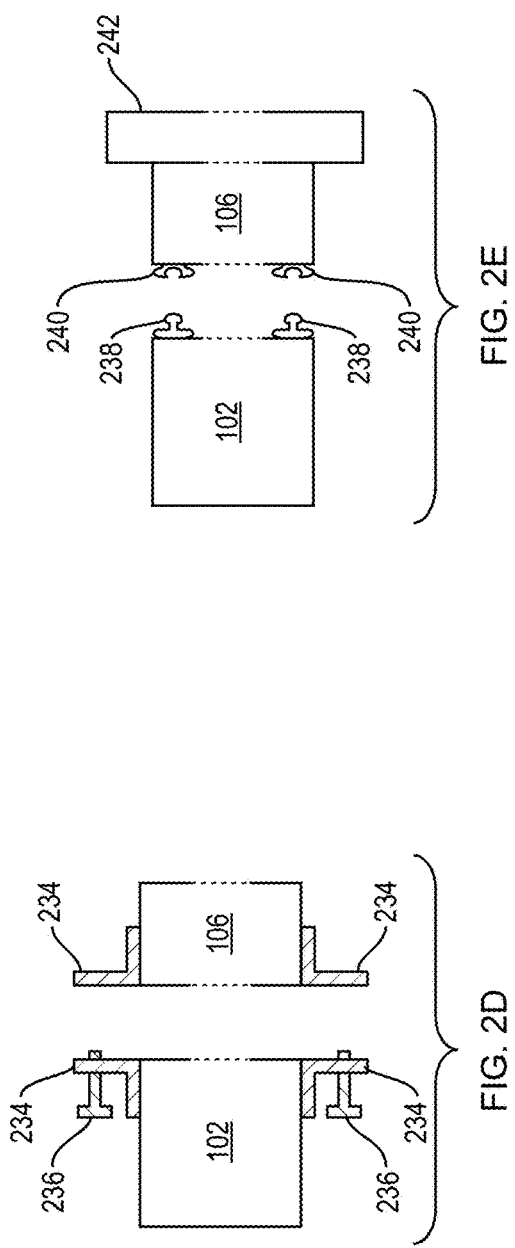

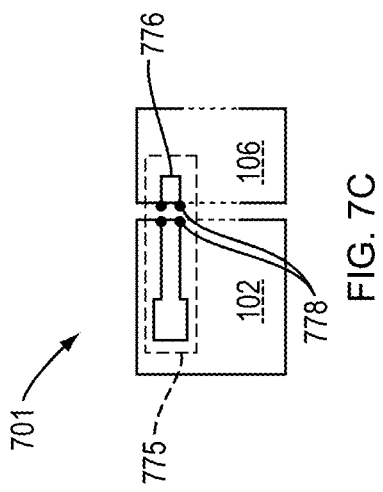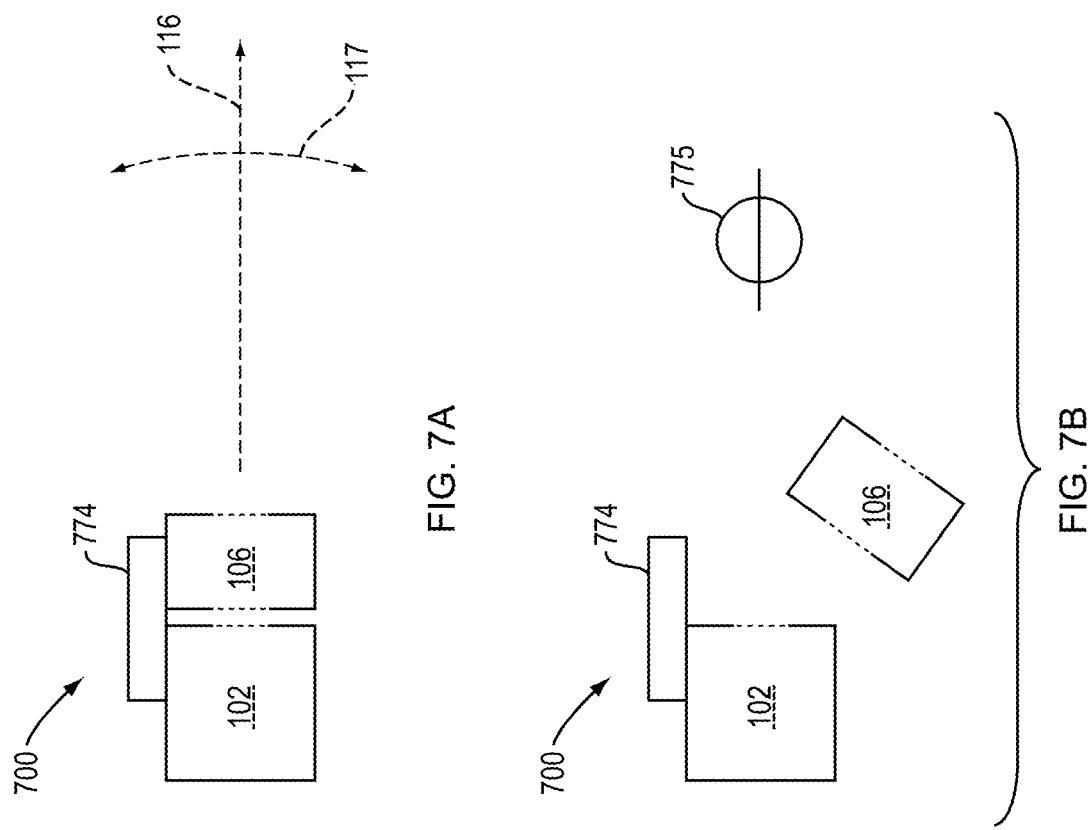

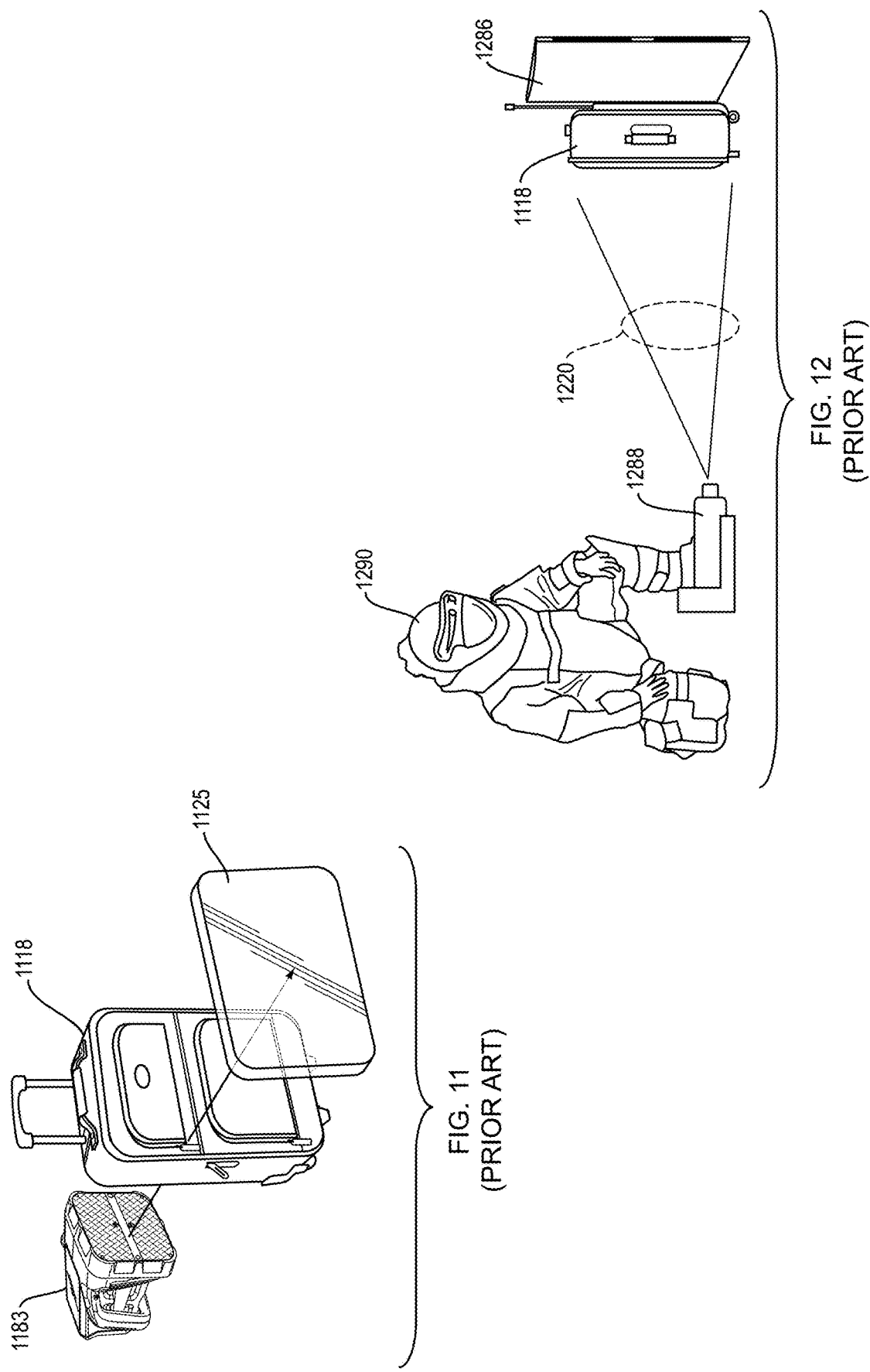

X-RAY IMAGING APPARATUS AND METHOD

RELATED APPLICATION

This application claims the benefit of U.S. Provisional Application No. 63/033,519, filed on Jun. 2, 2020. The entire teachings of the above application are incorporated herein by reference.

BACKGROUND

X-ray backscatter imaging has been used for detecting concealed contraband, such as drugs, explosives, and weapons, since the late 1980's. Unlike traditional transmission x-ray imaging that creates images by detecting the x-rays penetrating through an object, backscatter imaging uses reflected or scattered x-rays to create the image.

In the last few years, handheld x-ray backscatter imaging devices have been introduced into the market, enabling an operator to inspect suspect vehicles, packages, or other objects rapidly. These devices have been designed to be relatively compact and lightweight, allowing them to be operated for extended periods of time more easily.

SUMMARY

Backscatter imaging instruments such as handheld instruments can also be used to obtain transmission images of a target object by placing a non-pixelated (i.e. single channel) x-ray detector panel behind the object being imaged. The detector panel intercepts the sweeping beam after it has passed through the object, allowing a transmission image to be created simultaneously with the acquisition of the backscatter image. The limitation of this approach, however, is that the resolution of the transmission image is low, as the imaging resolution is defined by the size of the sweeping pencil beam as it passes through the object being imaged.

For bomb disposal or explosive ordnance technicians, high-resolution transmission images are an essential tool for safely deactivating an explosive device, as the precise location and routing of wires and the position of detonators must be accurately known. This is not possible using the transmission images acquired with a pencil beam from a backscatter imager.

Embodiments disclosed herein can also be used to acquire both backscatter images and also transmission images from the same apparatus. For example, the transmission images can be acquired with sufficient resolution to be useful for bomb or EOD disposal technicians. In one application, the backscatter images can be used to locate the presence of an organic explosive material, and the high-resolution transmission images can be used to assist in the deactivation of a detonation device that might also be present.

In one particular embodiment, an x-ray imaging apparatus includes: an x-ray source module configured to output source x-rays; a pencil-beam-forming module having an input port and an output port; and a module engagement interface configured to enable a user to select an aligned configuration of the x-ray source module and the pencil-beam-forming module. In the aligned configuration, the pencil-beam-forming module is aligned with the x-ray source module to receive the source x-rays at the input port of the pencil-beam-forming module and to output a scanning pencil beam through the output port of the pencil-beam-forming module toward a target, the module engagement interface further configured to enable the user to select a non-aligned configuration of the x-ray source module and the pencil-beam-forming module. In the non-aligned configuration, the pencil-beam-forming module is not aligned with the x-ray source module to receive the source x-rays at the input port nor to output the scanning pencil beam, the non-aligned configuration enabling the output source x-rays to form a stationary, wide-area beam directed toward the target.

The module engagement interface can include complementary attachment features on the pencil-beam-forming module and the x-ray source module that are configured to permit the pencil-beam-forming module and the x-ray source module to be attached to each other in the aligned configuration and detached from each other in the non-aligned configuration. The complementary attachment features can be mechanical latch, strap, snap, rivet, pin, or hook and loop fastener components. The complementary attachment features can be magnets or a magnet and a magnetically susceptible material.

The module engagement interface can include a rotational coupling or translational coupling between the pencil-beam-forming module and the x-ray source module. The module engagement interface can be further configured to enable the user to select the aligned or non-aligned configuration via a manual manipulation by the user of the pencil-beam-forming module via the module engagement interface. The module engagement interface can include an electro-mechanical actuator that is configured to move the pencil-beam-forming module relative to the x-ray source module responsive to user selection of the aligned or non-aligned configuration.

The apparatus can further include handles configured to accommodate handheld operation, robotic-platform-mounting features configured to couple the x-ray source module mechanically to a robotic platform for operation, or drone-mounting features configured to couple the x-ray source module mechanically to a drone for remote aerial operation.

The apparatus can further include a housing that fully or partially encompasses the x-ray source module, the pencil-beam-forming module, or both, the housing including a first housing output port configured to output the scanning pencil beam in the aligned configuration, and the housing including a second housing output port configured to output the stationary, wide-area beam in the non-aligned configuration. The module engagement interface may comprise a combination of the housing and an attachment feature that attaches the x-ray source module, the pencil-beam-forming module, or both to the housing.

The apparatus can further include one or more backscatter detectors that are configured to detect x-rays from the scanning pencil beam that are backscattered from the target. The backscatter detector(s) can form part of the pencil-beam-forming module and can be configured to remain fixedly attached to the pencil-beam-forming module in the aligned and non-aligned configurations.

An x-ray imaging system can include the x-ray imaging apparatus with any of the features above and further include a plurality of backscatter detectors that have different respective sizes and are selectively and interchangeably attachable to the x-ray source module or to the pencil-beam-forming module.

An x-ray imaging system can include the x-ray imaging apparatus with any of the features above and can also include a pixelated detector configured to receive x-rays that are transmitted through the target from the stationary, wide-area beam.

In another embodiment, an x-ray imaging apparatus includes: a beam-forming module configured to output x-rays from an x-ray source forming part of the beam-forming module, selectively, in a scanning-pencil-beam format and in a stationary, wide-area beam format.

In a further embodiment, a method of x-ray imaging includes: selectively forming, at a beam-forming module, using x-rays from an x-ray source forming part of the beam-forming module, an x-ray beam in a scanning-pencil-beam format; and selectively forming, at the beam-forming module, using x-rays from the x-ray source, an x-ray beam in a stationary, wide-area beam format.

The beam-forming module can further include a pencil-beam-forming module. Selectively forming the x-ray beam in the scanning-pencil-beam format can include aligning an input port of the pencil-beam-forming module with the x-ray source to receive the source x-rays at the input port. Selectively forming the stationary, wide-area beam can include mechanically displacing an input port of the pencil-beam forming module with respect to the x-ray source such that the input port of the pencil-beam-forming module is not aligned to receive the source x-rays at the input port.

The method can further include scanning the x-ray beam in the scanning-pencil-beam format over a first target; and irradiating the first target or a second target with the x-ray beam in the stationary, wide-area beam format.

In yet another embodiment, an x-ray imaging apparatus includes: an x-ray source module configured to output source x-rays; a pencil-beam-forming module that is selectively attachable to and detachable from the x-ray source module, the pencil-beam forming module being configured to receive the source x-rays and to output a scanning pencil beam when attached to the x-ray source module; and a safety interlock configured to stop the x-ray source module from outputting source x-rays in continuous operation upon a detachment of the pencil-beam-forming module from the x-ray source module.

In still a further embodiment, an apparatus for x-ray imaging includes: means for selectively forming, at a beam-forming module, using x-rays from an x-ray source forming part of the beam-forming module, an x-ray beam in a scanning-pencil-beam format; and means for selectively forming, at the beam-forming module, using x-rays from the x-ray source, an x-ray beam in a stationary, wide-area beam format.

In yet a further embodiment, an x-ray imaging apparatus includes: an x-ray source module configured to output source x-rays; and an x-ray beam mode selection interface configured to enable a user to select a scanning, pencil-beam-forming mechanical arrangement that is configured to form the source x-rays into a scanning pencil beam and to select, alternatively, a stationary, wide-area x-ray-beam-forming mechanical arrangement that is configured to form the source x-rays into a stationary, wide-area x-ray beam.

BRIEF DESCRIPTION OF THE DRAWINGS

FIG. 2A is a schematic block diagram illustrating an embodiment apparatus in which a module engagement interface includes lips and clips.

FIG. 2B is a schematic block diagram illustrating an embodiment apparatus in which the module engagement interface includes magnets and magnetically susceptible material.

FIG. 2C is a schematic block diagram illustrating an embodiment in which the module engagement interface includes posts and straps.

FIG. 2D is a schematic block diagram illustrating an embodiment in which the module engagement interface includes brackets and bolts.

FIG. 2E is a schematic block diagram illustrating an embodiment in which the module engagement interface includes snap discs, the apparatus further including an x-ray backscatter detector.

FIGS. 7A-7B are schematic block diagrams illustrating portions of the embodiment apparatus of FIGS. 1A-1B, further including a safety interlock.

FIG. 7C is a schematic block diagram similar to FIGS. 7A-7B, wherein the safety interlock specifically includes an electrical circuit.

FIG. 11 (prior art) is an image illustrating use of the apparatus of FIG. 10 with a non-pixelated detector to acquire transmission images of a travel bag in a pencil-beam-scanning system.

FIG. 12 (prior art) is an image and illustration showing use of a cone beam x-ray source combined with a pixelated detector panel to create a very high-resolution transmission image of a travel bag.

Figure 1B:
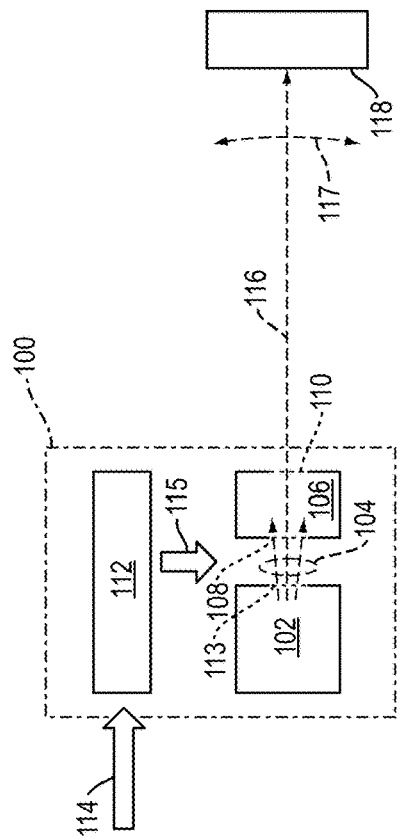
FIG. 1B is a schematic block diagram of the x-ray imaging apparatus of FIG. 1A in a non-aligned configuration that enables output of a stationary, wide-area beam of x-rays for high-resolution transmission imaging.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1A:
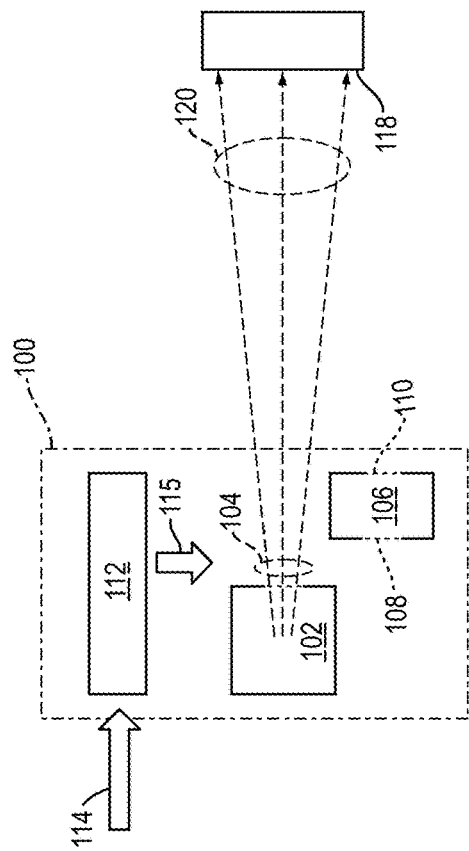
FIG. 1A is a schematic block diagram illustrating an embodiment x-ray imaging apparatus in an aligned configuration that permits a pencil beam of x-rays to scan a target object.

FIG. 1A is a schematic block diagram illustrating an embodiment x-ray imaging apparatus 100 in an aligned configuration that permits a pencil beam of x-rays 116 to scan a target object 118 with a scanning motion 117. The apparatus 100 includes an x-ray source module 102 that is configured to output source x-rays 104 from an output port 113 of the x-ray source 102. The apparatus 100 also includes a pencil-beam-forming module 106 having an input port 108 and an output port 110. The apparatus 100 further includes a module engagement interface 112 that is configured to enable a user to select the aligned configuration of the x-ray source module and the pencil-beam-forming module, such that in the aligned configuration, the pencil-beam-forming module is aligned with the x-ray source module 102 to receive the source x-rays 104 at the input port 108 and to output the scanning pencil beam 116 through the output port 110 toward the target 118. The enablement of a user selection is represented by arrow 114. An action of the module engagement interface 112 on the x-ray source module 102 and the pencil-beam-forming module 106 in order to effectuate the selection of the aligned configuration illustrated in FIG. 1A or a non-aligned configuration illustrated in FIG. 1B is represented by an arrow 115.

FIG. 1B is a schematic block diagram of the x-ray imaging apparatus of FIG. 1A in the non-aligned configuration of the x-ray source module 102 and the pencil-beam-forming module 106. In the non-aligned configuration, the pencil-beam-forming module 106 is not aligned with the x-ray source module 102 in order to receive the source x-rays 104 at the input port 108, nor to output the scanning pencil beam 116 from the output 110. Instead, the non-aligned configuration illustrated in FIG. 1B enables the output source x-rays 104 to form a stationary, wide-area beam 120 directed toward the target 118 (or a different target).

As used throughout this application, "a target" or "the target" should be understood to mean any one or more of a variety of targets. For example, the embodiments of FIGS. 1A-1B may be used in the aligned configuration, with the scanning pencil beam, in order to obtain an x-ray backscatter image in a scanning mode when used with an x-ray backscatter detector, such as those illustrated in example FIGS. 2E, 10, and 17. Then, in the non-aligned configuration depicted in FIG. 1B, the apparatus 100 may be used to output the stationary, wide-area beam 120 for transmission imaging of either the same target or another target 118, when used in connection with a pixelated x-ray transmission detector, such as the detector illustrated in FIGS. 12 and 16, for example. Thus, as applied to embodiments of the invention described herein, "target" or "target object" should be understood to mean one or more target objects to be imaged in either or any of the aligned and the non-aligned configurations.

In some embodiments, the x-ray source module 102 is an x-ray tube or another x-ray source. In other embodiments, the x-ray source module can be more complex, such as including an on-off switch; a separate housing; an internal x-ray collimator or other beam shaper; an electrical input or output for power, signals, etc.; complementary attachment features or other portions of the module engagement interface 112; etc. One example of a more complex x-ray source module is illustrated in FIGS. 15-16 and 18-19.

Figure 17:
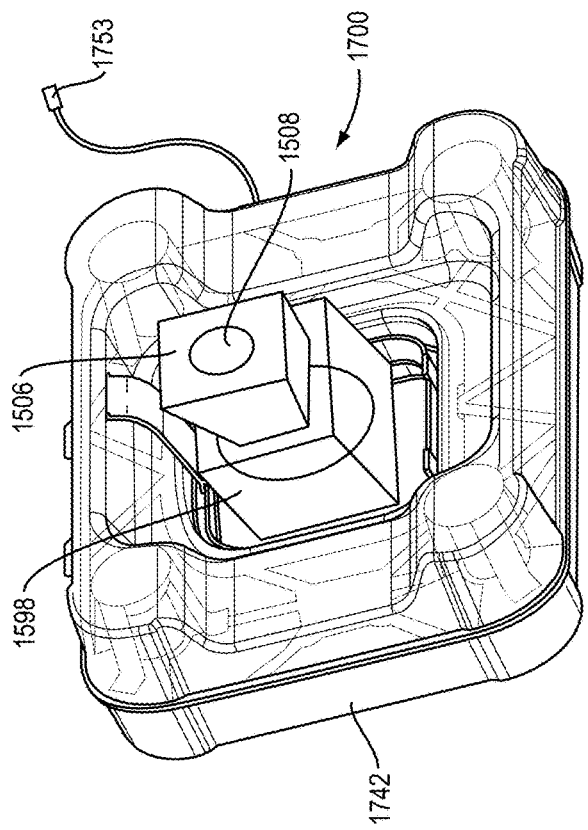
FIG. 17 is a perspective-view illustration of the pencil-beam-forming module of FIG. 15, together with an x-ray backscatter detector, mounted together in one detachable assembly.

The pencil-beam-forming module 106 can include a disk chopper wheel, such as that illustrated in FIG. 9, or FIGS. 15, 18, and 19, for example. The pencil-beam-forming module 106 can also include a collimator or other x-ray beam-shaping component, such as that illustrated in FIG. 9, or that illustrated in FIGS. 15, 18, and 19, for example. Other components, such as motors, mounting hardware, etc. may also be included in the module 106. In addition, portions of the module engagement interface 112, such as complementary attachment features illustrated in FIGS. 2A-2E, or such as rotational or translational couplings illustrated in FIGS. 3A-3B, may also be attached to the pencil-beam-forming module 106. Further, in some embodiments, the pencil-beam-forming module and an x-ray backscatter detector are coupled together, such as in the case illustrated in FIG. 2E or as illustrated in FIG. 17, for example.

The module engagement interface 112 can include complementary attachment features on the x-ray source module 102 and pencil-beam-forming module 106 that are configured to permit the pencil-beam-forming module and the x-ray source module to be attached to each other directly or indirectly in the aligned configuration and detached from each other in the non-aligned configuration. Examples of complementary attachment features include those described hereinafter in connection with FIGS. 2A-2E. In other embodiments, the module engagement interface may include a rotational coupling such as that illustrated in FIG. 3A, or a translational coupling, such as that illustrated in FIG. 3B. In the cases of rotational or translational couplings, the pencil-beam-forming module 106 may remain physically connected, directly or indirectly, to the x-ray source module 102 in both the aligned and the non-aligned configurations.

Figure 3B:
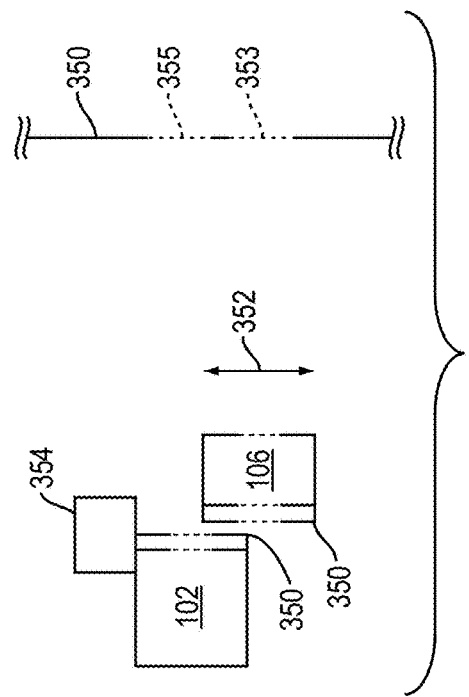
FIGS. 3A-3B are schematic block diagrams illustrating an embodiment apparatus wherein the module engagement interface includes a rotational coupling and a translational coupling, respectively.

In various embodiments, the user selection 114 may be via a manual manipulation of the apparatus 100 by a user, for example. In a lip and clip module engagement interface, illustrated in FIG. 2A, user selection 114 may be via a user unclipping clips attached to the pencil-beam-forming module from the lips attached to the x-ray source module. In other embodiments, user selection 114 may be via a user pulling the module 102 and module 106 apart from each other to overcome a magnetic force (FIG. 2B), undoing a strap from a post (FIG. 2C), undoing screws from a bracket (FIG. 2D), pulling apart the modules 102 and 104 to overcome snap disc engagement (FIG. 2E), rotating a hinge coupling (FIG. 3A), or sliding the modules with respect to each other along a translation coupling (FIG. 3B). In other embodiments, the user selection 114 may be received via an electrical signal, such as a signal to actuate an electromechanical actuator (FIGS. 3A-3B), for example.

The action of the module engagement interface 112, represented by the arrow 115, acting on the x-ray source module 102 and pencil-beam-forming module 106 to cause the aligned configuration or the non-aligned configuration, may include the lips and clips of FIG. 2A acting on each other or being released from one another, the magnet and magnetically susceptible material in FIG. 2B acting on one another or being released from one another, the straps and posts of FIG. 2C being connected to each other or released from one another, the screws and brackets of FIG. 2D being engaged or disengaged from one another, or the snap discs of FIG. 2E being engaged or disengaged from each other, for example. In other embodiments, where electromechanical actuators are used, such as in the optional features of FIGS. 3A-3B, the action 115 of the module engagement interface 112 may include the electromechanical actuator rotating the pencil-beam-forming module 106 with respect to the x-ray source module 102 about a rotational coupling (FIG. 3A) or the electromechanical actuator causing translation of the pencil-beam-forming module 106 with respect to the x-ray source module 102 along a translational coupling (FIG. 3B). It should be understood that the examples provided in the specification and drawings are not limiting, and many other means to enable a user to select the aligned configuration or the non-aligned configuration and of the module engagement interface acting on the modules 102, 106 to cause the alignment or non-alignment, are within the scope of embodiments.

The dashed line 100 as described above is used only schematically to delineate the extent of components that are included in the apparatus. However, some embodiments include a housing that encompasses either all or a portion of the components of the apparatus 100 illustrated in FIGS. 1A-1B. In the case of a housing encompassing all components, the dashed line representing the apparatus 100 can also schematically represent the housing. Any of the modules 102 and 106 and the module engagement interface 112 may be attached to the housing either separately or collectively. In addition, attachment features that attach the modules 102 and 106 to the housing may also serve as a module engagement interface, holding the modules 102 and 106 in an aligned configuration and permitting selection of a non-aligned configuration either by detachment from the housing or by any other means such as the examples described herein. The module engagement interface 112 can be a combination of the housing and an attachment feature, such as a bolt, that attaches the module 102, the module 106, or both to the housing.

A housing may be made of an x-ray shielding material such as lead, tungsten, or another high-atomic-number material. A housing may include an output port through which x-rays can easily pass. In some embodiments, both the scanning pencil beam and the stationary, wide-area beam may exit the housing through the same housing output port. However, in other embodiments, two different housing output ports may be provided, a first housing output port for the scanning pencil beam in the aligned configuration, and a second housing output port for the stationary, wide-area beam in the non-aligned configuration. One example is described hereinafter in relation to FIG. 3B.

As used herein, a "pencil beam" should be understood to have the common meaning attributed thereto in the art of backscatter x-ray imaging, wherein a pencil beam of x-rays is actively scanned over a target. Some of the x-rays that are backscattered from the target and not transmitted fully therethrough can be detected at an x-ray backscatter detector as a function of position of the pencil beam at the intersection with the target.

As also used herein, a "stationary, wide-area beam" should be understood to include an x-ray beam that is not scanned in position over time and is used for transmission x-ray imaging with a pixelated detector, as will be understood by those skilled in the art of x-ray imaging.

FIG. 2A is a schematic lock diagram illustrating an embodiment apparatus in which lips 222 formed on the x-ray source module 102, together with clips 224, attached to the pencil-beam-forming module 106, together form the module engagement interface 112 illustrated in FIGS. 1A-1B. The lips 222 and clips 224 are example complementary attachment features that permit the pencil-beam-forming module 106 and the x-ray module x-ray source module 102 to be attached to each other in the aligned configuration and to be detached from each other in the non-aligned configuration, similar to the configurations depicted schematically in FIGS. 1A-1B, respectively. Various alternative complementary attachment features are illustrated in FIGS. 2B-2E.

FIG. 2B is a schematic block diagram illustrating an embodiment apparatus in which magnets 228 mounted to the pencil-beam-forming module 106, together with a magnetically susceptible material 226 that is mounted to the x-ray source module 102, together constitute the module engagement interface. At sufficiently close proximity, the magnets 228 are securely attached to the magnetically susceptible material 226, thus securing the modules 102 and 106 together in the aligned configuration. The modules 102 and 106 may be pulled apart from each other manually, for example, for complete detachment from each other for a non-aligned configuration.

FIG. 2C is a schematic block diagram illustrating an embodiment apparatus in which straps 232 are used to secure the modules 102 and 106 together in the aligned configuration via connection of the straps 232 to posts 230 that are mounted to both modules 102 and 106. For detachment of the modules from each other for the non-aligned configuration, the straps 232 are removed from the posts 230 to release the modules 102 and 106 from each other.

FIG. 2D is a schematic block diagram illustrating an embodiment apparatus in which brackets 234 that are mounted to the modules 102 and 106 are secured to each other via bolts 236. The bolts 236 can be screwed through opposing brackets 234 to secure the modules to each other for the aligned configuration. The bolts 236 can be unscrewed to release the pencil-beam-forming module 106 from the source x-ray source module 102 for the non-aligned configuration.

FIG. 2E is a schematic block diagram illustrating an embodiment apparatus in which complementary snap discs 238 with lips are attached to the x-ray source module 102 and complementary snap discs 240 with grooves are attached to the pencil-beam-forming module 106. In this embodiment, as in the other embodiments shown in FIGS. 2A-2D, the complementary attachment features permit the modules 102 and 106 to be fixedly secured to each other with proper alignment in order to receive source x-rays 104 and to form the pencil beam 116 as illustrated in FIG. 1A in the aligned configuration.

As will be readily understood based on the description and drawings, in addition to the complementary attachment features of FIGS. 2A-2E, other complementary attachment features can include other features known in the mechanical arts, such as other mechanical straps, latches, snaps, rivets, pins, hook and loop fasteners such as Velcro®, and other fastener components.

The apparatus of FIG. 2E further includes an x-ray backscatter detector 242 that forms part of the pencil-beam-forming module 106 and is configured to remain fixedly attached to the pencil-beam-forming module 106 in both the aligned and the non-aligned configurations. For the non-aligned configuration, the combination 106, 242 is removed as a single unit, allowing the x-ray source module 102 to output the stationary, wide-area beam 120 illustrated in FIG. 1B for transmission imaging with a pixelated detector pixelated x-ray transmission detector. The backscatter detector 242 is configured to detect x-rays from the scanning pencil beam 116 (illustrated in FIG. 1A) that are backscattered from the target 118, where the scanning pencil beam 116 and target 118 are illustrated in FIG. 1A. Other example backscatter detectors that can form part of embodiments described herein are illustrated in FIGS. 4A-4C and 10.

Figure 3A:
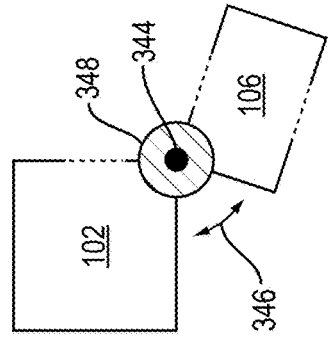

FIG. 3A is a schematic block diagram illustrating an embodiment apparatus wherein the module engagement interface includes a rotational coupling 344. In this embodiment, the rotational coupling 344 is particularly a hinge coupling. For the aligned configuration, the pencil-beam-forming module 106 is rotated with a rotation 346 about the hinge coupling 344 so that the input port of the pencil-beam-forming module 106 receives source x-rays and outputs a scanning pencil beam. For the non-aligned configuration, the module 106 is rotated with the rotation 346 out of a path of the source x-rays from the module 102, as illustrated in FIG. 1A. In this manner, the modules 102 and 106 remain mechanically connected to each other in the non-aligned configuration. It should be understood that various knobs, handles, etc. may be provided to facilitate the rotation 346 when it is effectuated manually by a user.

Also illustrated in FIG. 3A is an optional electromechanical actuator 348 that is configured to cause the rotation 346 about the rotational coupling 344. By this means, the pencil-beam-forming module 106 can be rotated with the rotational movement 346 relative to the x-ray source module 102 responsive to a user selection of the aligned or the non-aligned configuration. Where the optional electromechanical actuator 348 is provided, user selection may be via a wired or wireless signal to the electromechanical actuator 348, responsive to user input. User input may be provided via a touch screen or a remote control device, for example. Touchscreen operation is illustrated and described in connection with FIG. 6, while platforms that may be remotely operated are illustrated and described in connection with FIGS. 3C-3D, for example.

FIG. 3B is a schematic block diagram illustrating an embodiment apparatus that includes a translational coupling 350 between the x-ray source module 102 and the pencil-beam-forming module 106. In this embodiment, the translation coupling 350 is particularly a slide bracket, portions of which are attached to each module 102, 106. The slide bracket translational coupling 350 provides capability of a translation 352 as part of selection of the aligned and non-aligned configurations. Optionally, an electromechanical actuator 354, such as a linear lead screw actuator, may be provided to cause the translation 352 responsive to user selection. User selection can be similar to user selection described in connection with FIG. 3A where the electromechanical actuator 348 is provided.

Also illustrated in FIG. 3B is a portion of an optional housing 300 that can fully or partially encompass the apparatus, including the modules 102 and 106, the translation coupling 350, and the actuator 354. The optional housing 300 includes two optional x-ray output ports 353 and 355. Though not illustrated in FIG. 3B, the pencil-beam-forming module 106 may be attached to the housing 300, while the source x-ray module 102 may be attached to the module 106 only via the translational coupling 350. In this case, the arrow 352 represents motion of the module 102 with respect to the fixed combination of the module 106 and the housing 300, instead of motion of the module 106 with respect to a fixed combination of the module 102 and housing 300. In this manner, the first housing output port 353 outputs a scanning pencil beam when the x-ray source module is translated downward to be aligned with the pencil-beam-forming module 106. On the other hand, the second housing output port 355 outputs a stationary, wide-area beam when the x-ray source module is translated upward to be not aligned with the pencil-beam-forming module 106. It should be understood that first and second housing output ports may be useful in a similar manner in other embodiments with other types of module engagement interfaces.

Figure 3D:
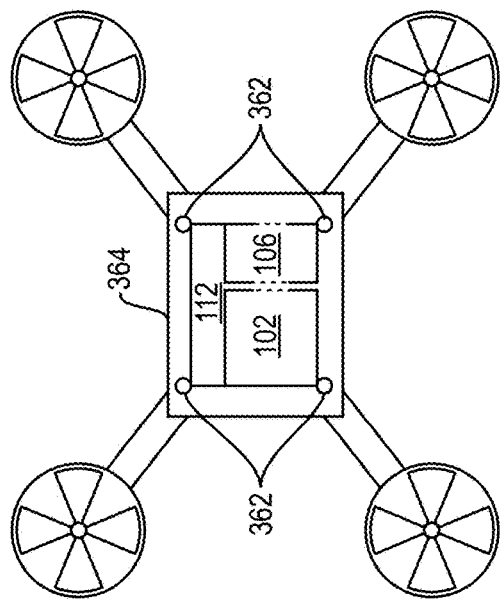
FIGS. 3C-3D are schematic diagrams illustrating embodiment apparatuses that are configured to be mounted to a robotic platform and to an unmanned aerial vehicle (UAV), respectively.
Figure 3C:
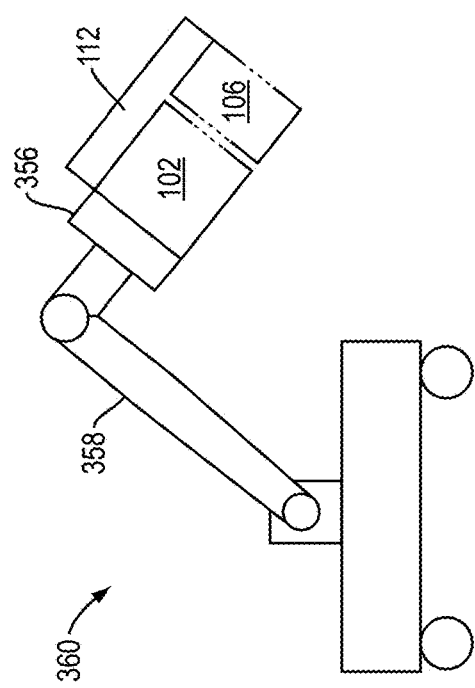

FIG. 3C is a schematic diagram illustrating an embodiment apparatus that is configured to be mounted to a robotic platform 360, specifically to a robotic arm 358 of the robotic platform 360, via robotic platform mounting features 356. The mounting features 356 may include complementary attachment features such as bolts, mechanical latches, straps, snaps, rivets, pins, hook and loop fastener components, etc., as will be understood by those of skill in the mechanical arts. The robotic platform 360 can include various translational, rotational degrees of freedom in order to permit a pencil beam or a stationary, wide-area beam to be directed from the apparatus toward a target appropriately.

FIG. 3D is a schematic diagram illustrating an embodiment apparatus that is configured to be mounted to an unmanned aerial vehicle (UAV) 364 (also referred to herein as a "drone") via mounting features 362. The robotic-based and drone-based embodiments of FIGS. 3C-3D can be particularly advantageous to perform remote inspection of a target, either for safety reasons or because of limited access to a target object that is to be imaged. In these embodiments, the electromechanical actuators 348 and 354 of FIGS. 3A-3B can be advantageous to allow user selection of the aligned and non-aligned configurations, selectively, via wired or wireless remote control, for example.

Figure 4B:
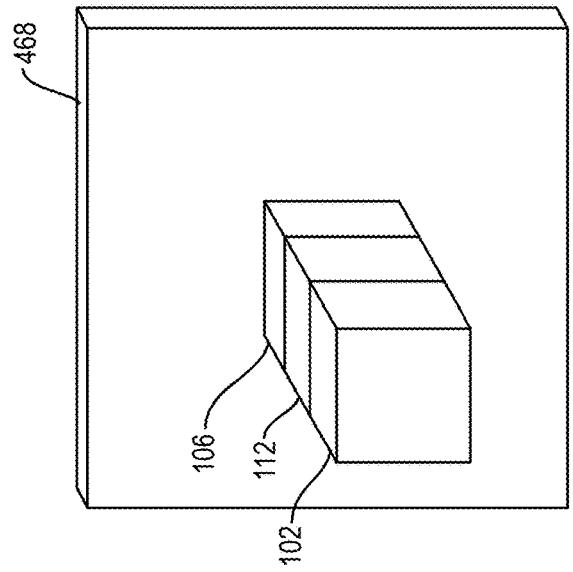
FIGS. 4A-4C are perspective-view diagrams illustrating the embodiment apparatus of FIGS. 1A-1B, further including smaller and larger x-ray backscatter detectors, respectively, that can be selectively and interchangeably attached to the apparatus.
Figure 4C:
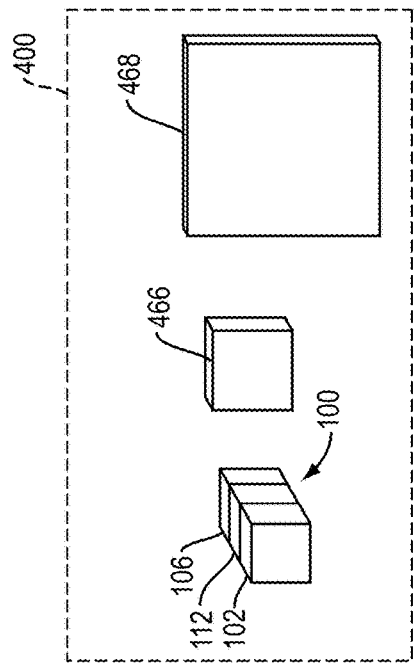
Figure 4A:
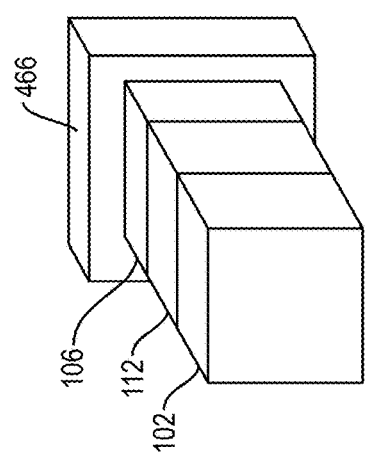

FIGS. 4A-4C are perspective-view diagrams illustrating the embodiment apparatus of FIGS. 1A-1B, further including relatively smaller and relatively larger x-ray backscatter detectors, respectively, that can be selectively and interchangeably attached to an embodiment apparatus. FIG. 4A shows the x-ray source module 102 and the pencil-beam-forming module 106, with the module engagement interface 112 depicted as holding the modules 102 and 106 together and aligned. The apparatus includes a relatively smaller backscatter x-ray detector 466.

The detector 466 is depicted as attached to the pencil-beam-forming module 106. It should be noted that FIG. 17 depicts another arrangement with an x-ray backscatter detector coupled to a pencil-beam-forming module. This arrangement can be advantageous since the x-ray backscatter detector can be present or removed with the pencil-beam-forming module, both of which may be preferably used in the aligned configuration in which pencil beam scanning is used and a backscatter image of the target is produced. However, in other embodiments, an x-ray backscatter detector, or a plurality of backscatter detectors that have different respective sizes, may be selectively, and even interchangeably, attachable to the x-ray source module 102.

FIG. 4B is a perspective-view diagram illustrating the embodiment apparatus coupled to a relatively larger x-ray backscatter detector 468 that can be used to obtain higher signal-to-noise backscatter images in the aligned configuration. The x-ray backscatter detectors 466 and 468 may be selectively and interchangeably attached to the apparatus, such as to the pencil-beam-forming module 106, or to the x-ray source module 102. This selective attachment can provide a small, compact design with the smaller detector 466 that can fit into tighter workspaces and be lighter and more convenient to hold in a handheld embodiment. This selective attachment can also have the advantage of providing the relatively larger detector 468 to obtain higher quality backscatter images when confined spaces are not at issue. In other embodiments, the relatively smaller detector 466 may remain attached to the apparatus, while the relatively larger detector 468 may be selectively added to the apparatus to supplement the detection sensitivity of the smaller detector 466.

FIG. 4C is a perspective-view diagram illustrating an embodiment system 400 including the embodiment x-ray imaging apparatus 100 and the plurality of detectors 466 and 468.

The embodiments presented in the detailed description hereinabove include a pencil-beam-forming module that can be removed from, displaced with respect to, or otherwise put into a non-aligned configuration with respect to an x-ray source module. More generally, embodiments extend to an x-ray imaging apparatus that includes a beam-forming module that includes an x-ray source and from which x-ray beams in both a scanning-pencil-beam format and in a stationary, wide-area beam format may be obtained, selectively, both from the same x-ray source. These embodiments are further described hereinafter in reference to example FIGS. 5-6.

Figure 5:
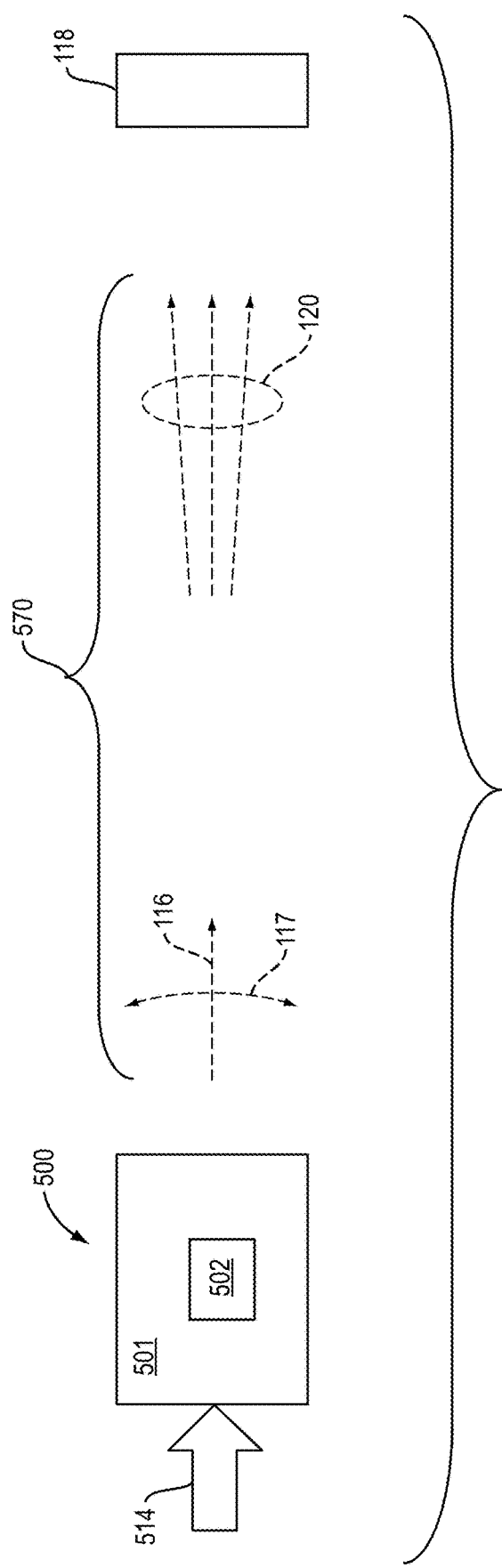
FIG. 5 is a schematic block diagram illustrating an embodiment apparatus that includes a more general beam-forming module that is configured to output x-rays in a scanning-pencil-beam format and in a stationary, wide-area beam format, selectively.

FIG. 5 is a schematic diagram illustrating an embodiment x-ray imaging apparatus 500. The apparatus 500 includes a beam-forming module 501 that is configured to output x-rays from an x-ray source 502 that forms part of the beam-forming module 501. The apparatus 500 receives a user selection 514, which specifies either a scanning pencil beam 116 with a sweeping pattern 117 to be output from the apparatus, or a stationary, wide-area beam 120 to be output from the apparatus, toward the target 118, according to a selectability 570. In some embodiments, the selectability may be provided via the beam-forming module 501 including a pencil-beam-forming module such as the module 106 described hereinabove. A pencil-beam-forming module can be used in the beam-forming module 501 in order to select an aligned or a non-aligned configuration, corresponding to the x-ray beam 116 and stationary, wide-area output beam 120, respectively. However, in other embodiments, other means may be provided for the selection.

Figure 6:
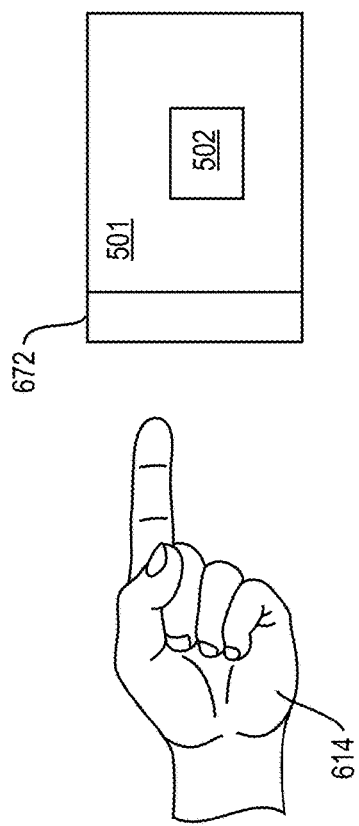
FIG. 6 is a schematic block diagram illustrating the embodiment apparatus of FIG. 5, further including an x-ray beam-mode-selection interface.

FIG. 6 is a schematic diagram illustrating how the selection 514 may be via a human hand 14 touching a touch screen 672 that forms part of the beam-forming module 501 that is attached to the beam-forming module 501. The touch screen 672 is an example of an x-ray beam mode selection interface that is configured to enable a user to select a scanning pencil-beam-forming (first) mechanical arrangement that is configured to form the source x-rays into a scanning pencil beam and to select, alternatively, a stationary, wide-area x-ray beam-forming (second) mechanical arrangement that is configured to form the source of x-rays into a stationary, wide-area x-ray beam.

According to other embodiments, a safety interlock feature is provided, such that x-ray radiation from an x-ray source module is automatically turned off when a pencil-beam-forming module is removed or misaligned with respect to the x-ray source module.

FIG. 7A is a schematic block diagram of an x-ray imaging apparatus 700. The apparatus 700 includes the x-ray source module 102 and pencil-beam-forming module 106, as described previously. The apparatus 700 also includes a safety interlock 774 that is configured to stop the x-ray source module from outputting source x-rays in continuous operation upon a detachment of the pencil-beam-forming module 106 from the x-ray source module 102. Thus, when the modules 102 and 106 are attached to each other and aligned, the pencil-beam-forming module 106 is configured to receive source x-rays from the x-ray source module 102 and to output a scanning pencil beam 117.

FIG. 7B is a schematic diagram illustrating the apparatus 700 in FIG. 7A in a detached, non-aligned state. Upon detachment of the pencil-beam-forming module 106 from the x-ray source module 102, the safety interlock 774 causes the x-ray source module 102 to stop outputting source x-rays, as illustrated at 775. The safety interlock 774 may be electrical, mechanical, or electromechanical, according to design principles that are well understood generally by those who implement safety interlocks in medical and industrial equipment. However, prior to this disclosure, there has not been a need or consideration to implement a safety interlock that operates in the manner specified herein, namely to act to stop x-ray outputs from an x-ray source module upon a detachment of a pencil-beam-forming module, because such detachment has not previously been contemplated.

FIG. 7C is a schematic block diagram illustrating an x-ray imaging apparatus 701 that is similar to the apparatus 700 illustrated in FIGS. 7A-7B. However, the apparatus 701 in FIG. 7C has a safety interlock 775 that is an electrical circuit. When the modules 102 and 106 are attached to each other, electrical current flows through a continuity loop 776 via electrical contacts 778 that are present in corresponding locations at mechanically opposing edges of the modules 102 and 106. While electrical current flows through the continuity loop 776, output of a scanning x-ray beam is enabled because source x-rays emanate from the x-ray source module 102. However, upon detachment of the pencil-beam-forming module 106, the electrical contacts 778 on the modules 102, 106 are no longer in contact with each other, and electrical current does not flow through the continuity loop 776. When the electrical current stops flowing, the safety interlock circuit 775 stops the output of x-rays from the x-ray source module 102. The stopping may be via a mechanical shutter that is automatically actuated to block source x-rays. However, advantageously, the safety interlock safety interlock circuit 775 may cause power to an x-ray source in the x-ray source module 102 to be cut off completely, which is a simpler and more preferable implementation.

Figure 8:
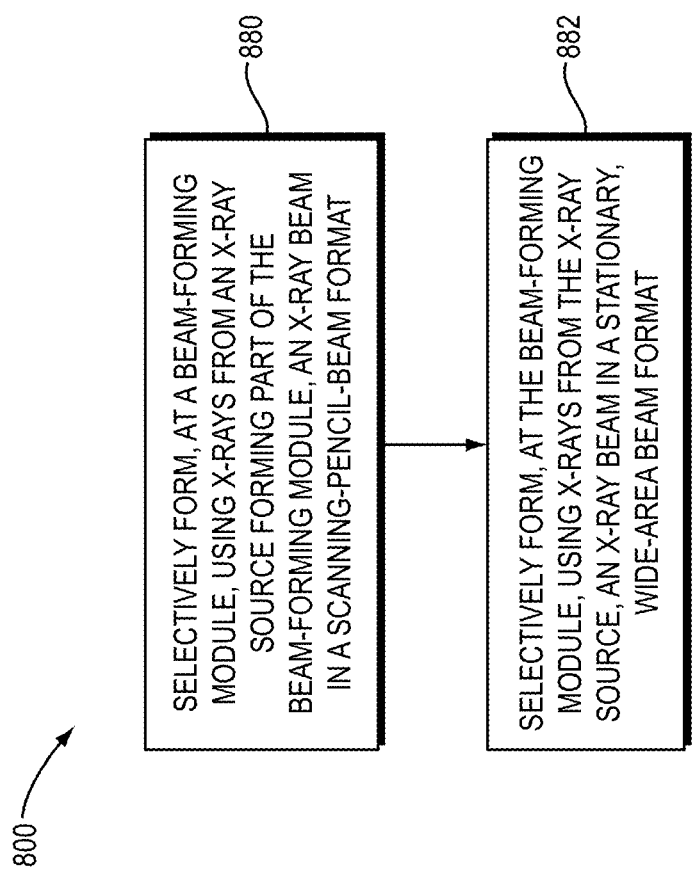
FIG. 8 is a flow diagram illustrating a procedure for x-ray imaging according to an embodiment method.

FIG. 8 is a flow diagram illustrating an embodiment procedure 800 for x-ray imaging. At 880, an x-ray beam in a scanning pencil beam format is selectively formed, at a beam-forming module, using x-rays from an x-ray source forming part of the beam-forming module. At 882, an x-ray beam in a stationary, wide-area beam format is selectively formed, at the beam-forming module, using x-rays from the x-ray source. The procedure 800 can be performed using any of the embodiment apparatuses or systems described herein, such as those illustrated in FIGS. 1A-1B and FIGS. 5-6, for example.

The procedure 800 highlights a feature of various embodiment apparatus, systems, and methods, that both a scanning pencil beam and a stationary, wide-area beam may be obtained from the same x-ray source and apparatus. In some embodiments, such as those described in connection with FIGS. 1A-1B, the two different types of x-ray beams may be selectively provided via the module engagement interface 112 acting on the x-ray source module 102 and the pencil-beam-forming module 106 to provide the aligned configuration or the non-aligned configuration, selectable by a user. However, in other embodiments, such as those illustrated in FIGS. 5-6, the selection of beam types may be provided by other means. It should be understood that, according to the procedure 800, both of the different beam types are selected at different respective times.

According to other descriptions of embodiment apparatuses and systems provided herein, it will be understood that various other actions may be included in embodiment procedures. For example, in cases where the beam-forming module further includes a pencil-beam-forming module such as the module 106 in FIG. 1A, selectively forming the x-ray beam in the scanning-pencil-beam format at 880 can include aligning an input port of the pencil-beam-forming module with the x-ray source to receive the source x-rays at the input port of the scanning pencil beam of the pencil-beam-forming module. Furthermore, where the beam-forming module further includes the pencil-beam-forming module, selectively forming the stationary, wide-area beam according to 882 can include mechanically displacing an input port of the pencil-beam-forming module with respect to the x-ray source such that the input port of the pencil-beam-forming module is not aligned to receive the source of x-rays at the input port. Still further, other embodiment procedures may further include scanning the x-ray beam in the scanning-pencil-beam format over a first target and a radiating the first target or a second target with the x-ray beam in the stationary, wide-area-beam format.

Figure 9:
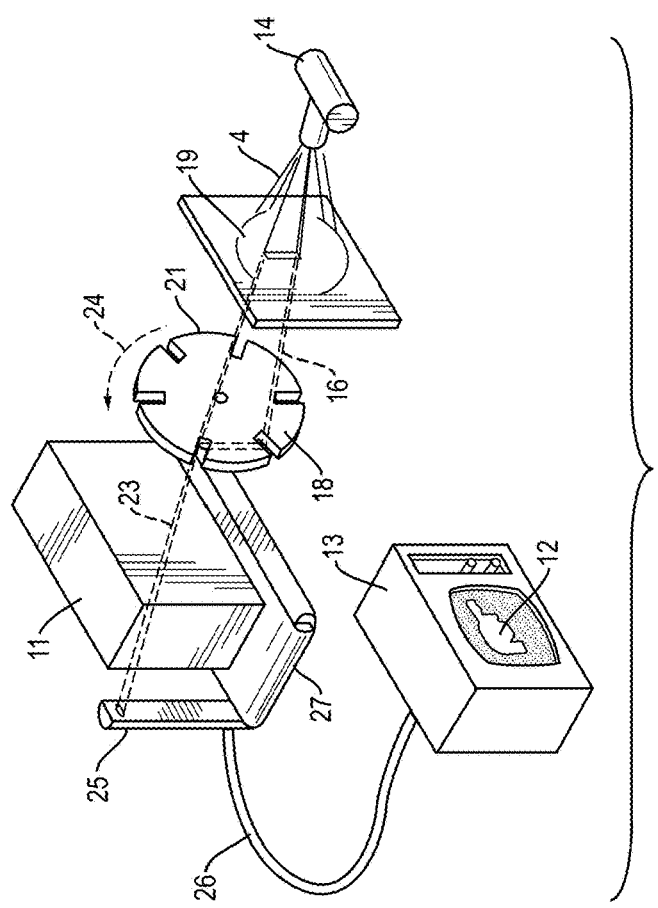
FIG. 9 (prior art) is a perspective-view schematic illustration of a system that can be used for x-ray backscatter imaging.

FIG. 9 (prior art) is a perspective-view schematic illustration of a system that illustrates basic principles of x-ray backscatter imaging. A standard x-ray tube 14 generates source x-rays 4, which are collimated into a fan beam 16 by a slit in an attenuating plate 19. The fan beam 16 is then "chopped" into a scanning pencil beam 23 by a rotating chopper wheel 18 with slits 21 defined therein. The scanning pencil beam 23 scans over the target object that is being imaged as the chopper wheel 18 rotates with a rotation 24. An intensity of x-rays that are scattered in a backwards direction (back from a scanned target object 11) is then recorded by one or more large area backscatter detectors (not shown in FIG. 9) as a function of a position of the illuminating, scanning pencil beam 23.

By moving the object through the plane containing the scanning beam, either on a conveyor 27 or under its own power, a two-dimensional backscatter image of the target object 11 can be obtained. Alternatively, the target object 11 can be stationary, and the imaging system (including the x-ray source 14, attenuating plate 19, and chopper wheel 18) can be moved relative to the target object 11. In some cases, a transmission detector 25 can be used simultaneously with the backscatter imaging to obtain a transmission image based on the scanning pencil beam, via an example signal cable 26, monitor 13, etc. In this manner, an image of contraband 12 may be obtained based on the use of the transmission detector 25, in addition to any x-ray backscatter images obtained with backscatter detectors.

Figure 10:
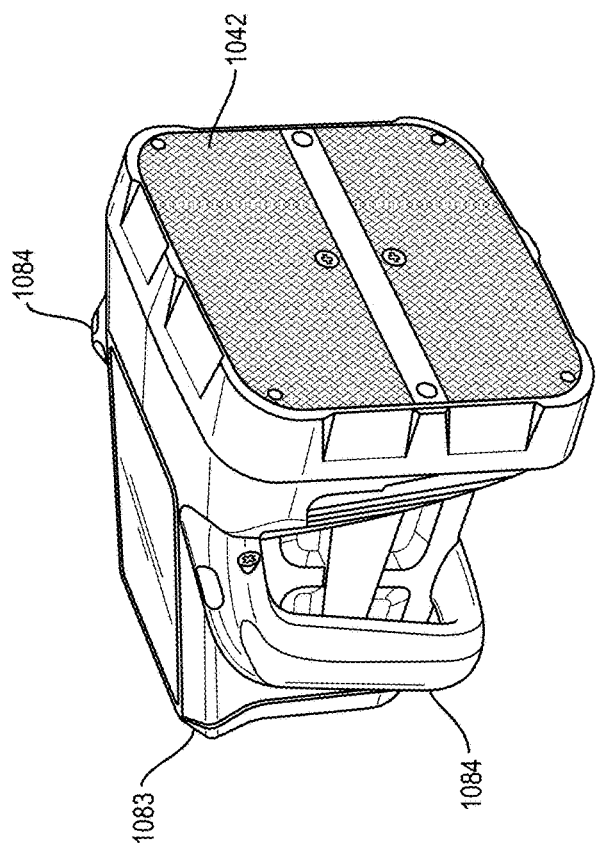
FIG. 10 (prior art) is an image showing an existing handheld backscatter x-ray imaging instrument, manufactured by Viken Detection Corporation, that operates at 120 kV, with compact, built-in backscatter detectors.

FIG. 10 (prior art) is an image showing an existing handheld x-ray imaging instrument 1083, manufactured by Viken Detection Corporation, that operates at 120 kV with compact, built-in backscatter detectors 1042. Handles 1084 that are configured to be held by human hands facilitate handheld operation. In the past few years, handheld x-ray backscatter imaging devices have been introduced into the market, enabling an operator to inspect suspect vehicles, packages, or other objects rapidly. These devices have been designed to be relatively compact and lightweight, allowing them to be operated for extended periods of time more easily. Various embodiments described herein can incorporate features of the backscatter x-ray imaging system illustrated in FIG. 10. Certain aspects of the system shown in FIG. 10 have been described in U.S. patent application Ser. No. 15/946,425, filed on Apr. 5, 2018 (now U.S. Pat. No. 10,770,195), which is hereby incorporated herein by reference in its entirety.

FIG. 11 (prior art) is an image illustrating use of the device 1083 of FIG. 10 with a non-pixelated detector panel 1125 to acquire transmission images of a travel bag 1118 in a pencil-beam-scanning system. FIG. 11 illustrates how an existing x-ray backscatter imager device can also obtain transmission images of a target object by placing the non-pixelated detector panel 1125 (i.e., single channel) x-ray detector panel behind the object being imaged. The detector panel intercepts the sweeping x-ray pencil beam after it has passed through the object, allowing a transmission image to be created simultaneously with the acquisition of the backscatter image.

However, a significant limitation of the FIG. 11 approach is that the resolution of the transmission image acquired in this manner is low, since the imaging resolution is defined by a size of the sweeping pencil beam as it passes through the target object being imaged. For example, the sweeping pencil beam can be on the order of 5 mm in width at about 30 cm from a front of the small handheld backscatter imaging instrument 1083, creating transmission images which can be perceived as being out of focus or blurry. This is especially the case when the transmission images are compared with an image acquired with a very high-resolution, pixelated, flat-panel transmission detector as illustrated in FIG. 12, which is typically used in the field by bomb disposal technicians 1290.

FIG. 12 (prior art) is an image and illustration showing use of a cone beam x-ray source 1288 combined with a pixelated detector panel 1286 to create a very high-resolution transmission image of the target travel bag 1118. A user 1290 can place the x-ray source 1288 on one side of the target object travel bag 1118 to illuminate the target 1118 with the cone beam 1220 while the pixelated transmission detector panel 1286 acquires transmission signals.

Figure 13:
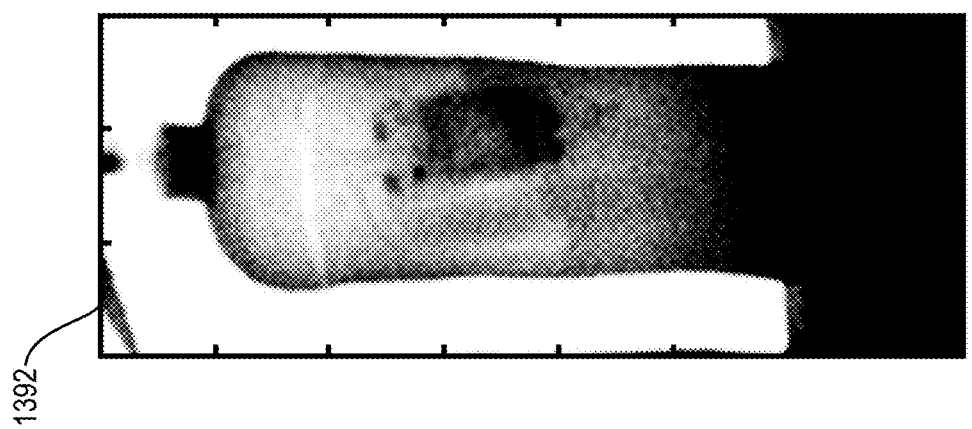
FIG. 13 (prior art) is an example transmission image created with the pencil beam-scanning system shown in FIG. 11.

FIG. 13 (prior art) is an example image 1392 of an explosive device concealed inside a fire extinguisher inside the suitcase target 1118. The image 1392 is acquired with a pencil beam from the handheld backscatter imager 1083 combined with a non-pixelated detector panel 1125, as in the setup of FIG. 11.

Figure 14:
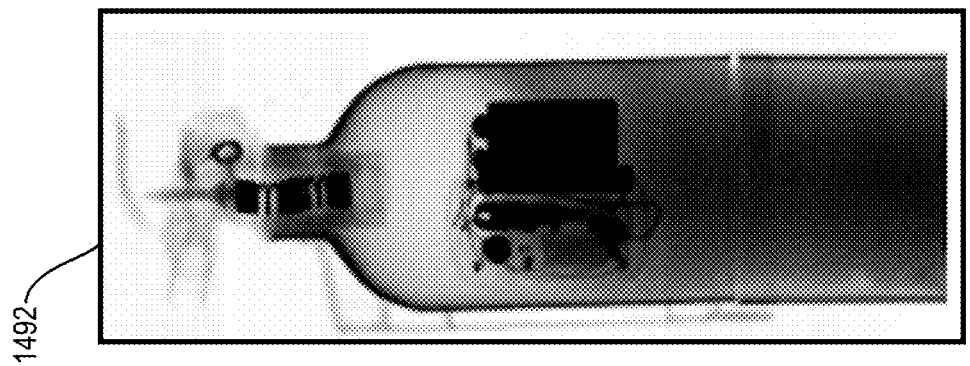
FIG. 14 (prior art) is an example transmission image created with the stationary cone beam system of FIG. 12.

FIG. 14 (prior art) is an image 1492 of the same explosive device as in FIG. 13, concealed inside the fire extinguisher inside the same suitcase target 1118. However, the image 1492 in FIG. 14 is acquired with the cone beam 1220 of x-rays and the pixelated, flat-panel detector illustrated in FIG. 12. It can be seen that resolution in the image 1492 is far superior to resolution in the image 1392.

For bomb disposal or explosive ordnance technicians, high-resolution transmission images, such as the image 1492, are an essential tool for safely deactivating an explosive device, as the precise location and routing of wires and the position of detonators must be accurately known. This is not possible using the transmission images acquired with a scanning pencil beam from a backscatter imager, as illustrated in FIG. 11, for example. However, the image 1492 acquired with the cone beam and pixelated transmission detector panel provides the needed resolution to deactivate the device safely. It would be desirable to be able to acquire both types of images from the same apparatus.

Advantageously, various embodiments disclosed in this application relate to a handheld or other portable apparatus that can obtain backscatter images with a scanning pencil beam, with all the advantages thereof, and which can also be used to acquire high-resolution transmission images with sufficient resolution to be used for bomb disposal or explosive ordnance disposal (EOD) technicians. In one application, the backscatter images can be used to locate a presence of an explosive organic material, and the higher resolution transmission images, obtained via a cone beam from the same apparatus, can be used to assist in the deactivation of a detonation device that can also be present.

Various embodiments can be switched between two imaging modalities rapidly. In a first imaging modality, a backscatter imaging mode relies on a sweeping pencil beam of x-rays. In a second imaging modality, a high-resolution transmission imaging mode relies on a stationary, wide-area x-ray beam such as a cone beam. In some embodiments, the stationary, wide-area x-ray beam has a cross-sectional beam intensity profile that is substantially circularly symmetric. However, in other embodiments, the cross-sectional beam intensity profile is substantially oval or rectangular.

Figure 15:
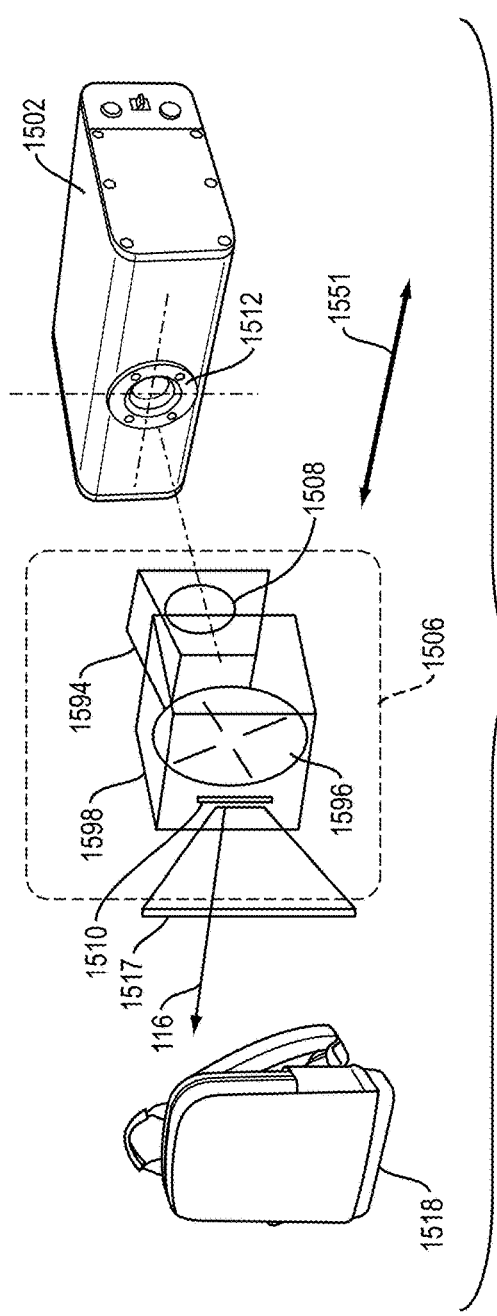
FIG. 15 is a perspective-view image and schematic illustrating an embodiment x-ray imaging apparatus that includes an x-ray source and a detachable pencil beam-forming module.

In order to use the particular embodiments in a backscatter imaging modality, a detachable module that includes a beam-forming chopper wheel mechanism is attached to an x-ray source module. A pencil-beam-forming disk chopper wheel may form part of a pencil-beam-forming module, as illustrated in FIG. 15, for example. In embodiments, the pencil-beam-forming module collimates an output cone beam of the source down to a fan beam that is incident on the rotating disc chopper wheel, which defines therein one or more slits, which may also be referred to as "slit apertures." A resulting sweeping pencil beam that emerges from the output side of the pencil-beam-forming module can be used to illuminate the target object being imaged, and the backscattered x-rays from the target object can be detected in one or more x-ray backscatter detectors.

In order to image in transmission mode, the detachable pencil-beam-forming module in various embodiments can be removed or otherwise put into a non-aligned configuration with respect to the x-ray source module, and the un-collimated cone beam emitted from the x-ray source module can be used to illuminate the target object being imaged. A high-resolution, pixilated transmission detector panel can be placed behind the object, enabling acquisition of the transmission image.

An enabling feature of various embodiments is a rapidly detachable pencil-beam-forming module that allows a user to switch rapidly from a backscatter imaging modality to a high-resolution transmission imaging modality.

In one embodiment, a dual modality portable imaging system includes a detachable pencil-beam-forming module, wherein the apparatus can acquire backscatter x-ray images with a sweeping pencil beam of x-rays in one imaging mode and transmission images with a cone beam in a second imaging mode.

In various embodiments, backscatter detectors and the pencil-beam-forming module may be mounted together into a detachable assembly, as illustrated in FIG. 17, for example. The pencil-beam-forming module and backscatter detectors can be detachable from one another, allowing backscatter detectors of different sizes to be mounted to the pencil-beam-forming module, as illustrated in FIGS. 4A-4C, for example.

Some embodiments may be mounted on a robotic platform for remote operation, and the apparatus may include robotic platform mounting feature(s) enabling the imaging apparatus to be so mounted, as described in connection with FIG. 3C, for example. Some embodiments apparatuses may be mounted on a drone for remote aerial operation and include drone mounting features enabling the apparatuses to be so mounted, as illustrated in FIG. 3D, for example. The imaging modality of embodiments may be switched from one modality to the other manually, such as by manual manipulation of complementary attachment features, a hinge coupling, or a translational coupling. A modality switch or modality setting may be included on the system or on a control for the system to enable the manual switching from one modality to the other. As an alternative, the imaging modality of the system may also be switchable from one modality to the other using an automated mechanism, such as example actuators illustrated in FIGS. 3A-3B.

In one embodiment, an automated mechanism may cause backscatter imaging to be performed using the sweeping pencil beam, then remove or disable the pencil-beam-forming module from the apparatus, and then apply a stationary cone beam to perform high-resolution transmission imaging using a pixelated transmission detector panel. The automated mechanism may perform transmission and then backscatter imaging by attaching the pencil-beam-forming module to the apparatus at appropriate times.

FIG. 15 is a perspective-view image and schematic diagram illustrating an embodiment x-ray imaging apparatus that includes an x-ray source module 1502 and a detachable pencil-beam-forming module 1506. The apparatus is being used to image a target object backpack 1518. The detachable pencil-beam-forming module 1506 is designed to connect or disconnect easily and rapidly with an x-ray radiation output port 1512 of the x-ray source module 1502. In the embodiment of FIG. 15, an input port 1508 of a pre-collimator 1594 that forms part of the pencil-beam-forming module 1506 is designed to slide onto the x-ray radiation output port 1512 of the x-ray source module 1502 and to be locked in place with a locking mechanism (not illustrated in FIG. 15). In this manner, the locking mechanism (not shown) and the output port 1512 together form complementary attachment features, a type of module engagement interface within the scope of disclosed embodiments.

The pencil-beam-forming module 1506 includes a rotating chopper wheel 1596 with slit apertures that create a scanning pencil beam 116 that scans across an output beam plane 1517 as the chopper wheel 1596 rotates. The chopper wheel 1596 is housed in a housing 1598 that includes an output port 1510, which is an output port of the pencil-beam-forming module 1506. The input port 1508 of the pre-collimator 1594 serves as an input port of the pencil-beam-forming module 1506.

In the embodiment of FIG. 15, the output beam plane 1517 is a vertical plane, but in other embodiments, the output plane is a horizontal plane or has another arbitrary orientation. This enables backscatter images to be acquired as the entire apparatus is moved horizontally along a direction 1551 relative to the target object 1518 being scanned. The backscatter detectors are not illustrated in FIG. 15, but their placement can generally be in a vicinity between the target object backpack 1518 and the module 1506 or the module 1502.

Figure 16:
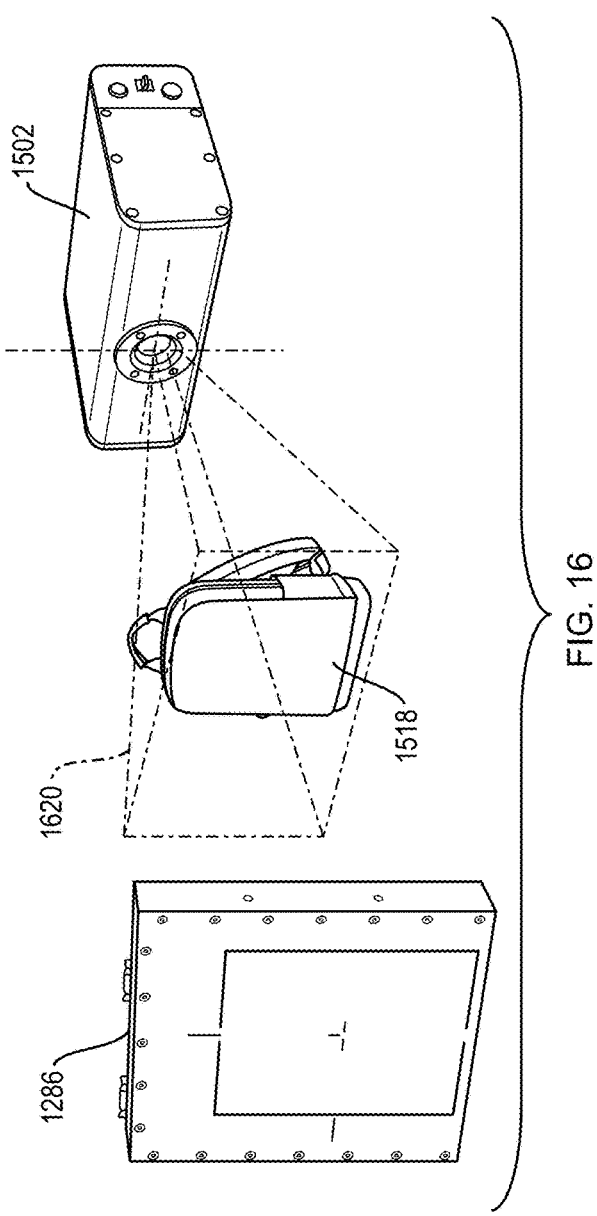
FIG. 16 is a perspective-view image and illustration showing the x-ray source module of FIG. 15 with the pencil beam-forming module removed therefrom, thus being in a non-aligned configuration in which the x-ray source module outputs a stationary, wide-area x-ray beam for high-resolution transmission images using a pixelated transmission detector.

FIG. 16 is a perspective-view image an illustration showing the x-ray source module of FIG. 15 with the pencil-beam-forming module 1506 removed therefrom. Thus, a non-aligned configuration is illustrated in FIG. 16, in which the x-ray source module 1502 outputs a stationary, wide-area x-ray beam for high-resolution transmission imaging using the pixelated transmission detector 1286. The pixelated flat-panel x-ray detector 1286 is placed on the far side of the target object 1518 that is being imaged. The x-ray detector 1286 intercepts a cone beam 1620 of x-ray radiation that is emitted from the x-ray source module 1502 when the pencil-beam-forming module 1506 is not in place, (in the non-aligned configuration).

As noted hereinabove, FIGS. 4A-4C illustrate an embodiment handheld backscatter imager with detachable backscatter detectors, enabling backscatter detectors of different sizes to be fitted to the apparatus depending on the application. For example, for use in confined spaces, a smaller detector can be used. On the other hand, for imaging large objects or surfaces at greater distances, a larger backscatter detector is advantageous, since this allows images to be acquired at greater standoff distances, reducing the time to perform an inspection. Such detectors may be used in combination with various embodiments, including the embodiment of FIG. 15.

FIG. 17 is a perspective-view illustration of the pencil-beam-forming module 1506 of FIG. 15, together with an x-ray backscatter detector 1742, mounted together in one detachable assembly 1700. The pencil-beam-forming module 1506 and the surrounding backscatter detector 1742 are packaged as the one detachable assembly 1700 and can be used to acquire backscatter images. This can be done by connecting, and thus aligning, the input port 1508 to the radiation output port of an x-ray source module, such as the x-ray source module illustrated in FIGS. 15-16. A cable 1753 provides power to the detector 1742 and to a chopper wheel motor (not shown) to drive the chopper wheel that forms part of the pencil-beam-forming module 1506. The cable 1753 can also be used as a path for signals to the output from the detector 1742.

Various features of the detector 1742 have been described in U.S. patent application Ser. No. 16/265,992, filed Feb. 1, 2019 (now U.S. Pat. No. 10,794,843), which is hereby incorporated herein by reference in its entirety. Various other features described in U.S. patent application Ser. No. 16/265,992 can be added to embodiments described herein.

Figure 18:
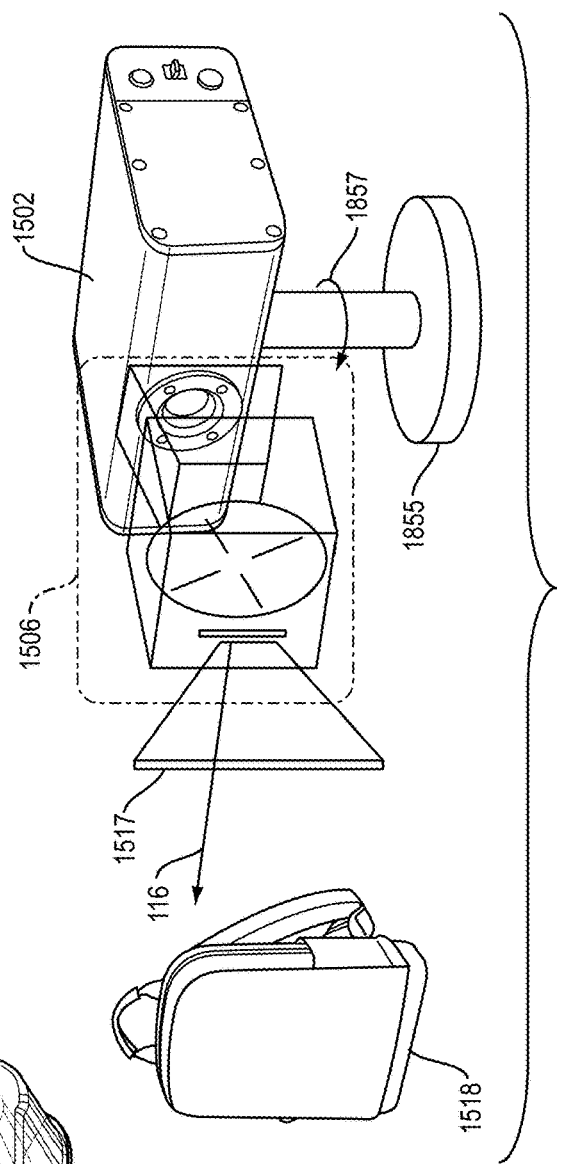
FIG. 18 is an image and illustration showing the x-ray imaging apparatus of FIG. 15, modified to be mounted on a rotating platform, providing a sweeping pencil beam scanning in a vertical plane.

FIG. 18 is an illustration showing the x-ray imaging apparatus of FIG. 15, modified to be mounted onto a rotating platform 1855 that has a rotation 1857. The apparatus of FIG. 18 allows the sweeping pencil beam 116 to be scanned in the vertical plane 1517. In addition, rather than translating the imaging apparatus past the object, as indicated by arrow 1551 in FIG. 15, for example, the entire imaging system can be mounted on the platform 1855 and can be rotated as indicated by the arrow 1857, providing the full raster-scanning capability of the beam 116 across the target object 1518 being imaged via the rotation 1857, instead of translation.

Figure 19:
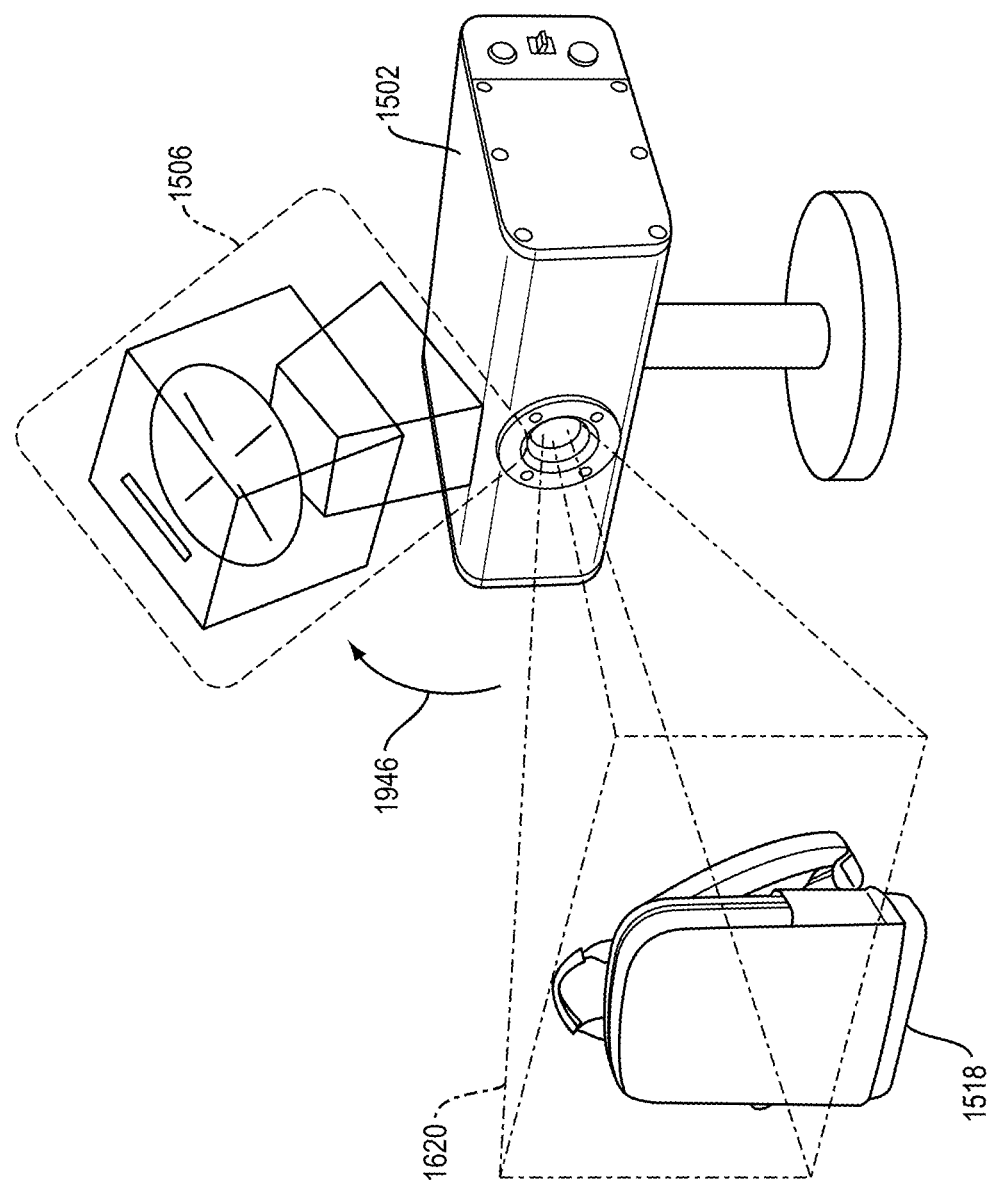
FIG. 19 shows the embodiment apparatus of FIG. 18 with an added rotational coupling module engagement interface, which is advantageous for robot-based or drone-based, remote x-ray inspection.

FIG. 19 is a perspective-view illustration of the embodiment apparatus of FIG. 18, wherein the module engagement interface includes a rotational coupling (not shown). A rotational coupling is useful when an embodiment apparatus is mounted on a robot or drone platform to perform remote inspection, as described in connection with FIGS. 3C-3D, for example. Remote inspection can be advantageous either for safety reasons or because of limited access to a target object to be imaged. When used with an optional electromechanical actuator, the apparatus can be controlled remotely to output either a scanning pencil beam output or a stationary, wide-area beam. The rotation 1946 of the pencil-beam-forming module 1506 with respect to the x-ray source module 1502 can be provided by a hinge coupling or other rotational coupling component, and optionally an electromechanical actuator, as illustrated in FIG. 3A, for example. As an alternative, switching from the backscatter imaging mode to the transmission mode (or vice versa) can be performed manually by an operator, or the switching process whereby the pencil-beam-forming module is disconnected or connected to the x-ray source module can be automated using a switching mechanism.

FIG. 19 illustrates the pencil-beam-forming module rotated out of the path of the x-rays emitted by the source, as indicated by a rotation arrow 1946. This rotation can be achieved by a servo mechanism or a motor, for example. However, as will be understood by those of skill in the art in view of this specification, there are many other means, within the scope of the embodiments described herein, by which the pencil-beam-forming module can be moved out of the way of the emitted source x-rays to achieve the non-aligned configuration.

In a further embodiment, a means of providing fiducial markers in the backscatter and transmission images can allow for an accurate overlay of information contained in the two images to be obtained.

While example embodiments have been particularly shown and described, it will be understood by those skilled in the art that various changes in form and details may be made therein without departing from the scope of the embodiments encompassed by the appended claims.

What is claimed is:

1. An x-ray imaging apparatus comprising:
   an x-ray source module configured to output source x-rays;
   a pencil-beam-forming module having an input port and an output port; and
   a module engagement interface configured to enable a user to select an aligned configuration of the x-ray source module and the pencil-beam-forming module, wherein, in the aligned configuration, the pencil-beam-forming module is aligned with the x-ray source module to receive the source x-rays at the input port and to output a scanning pencil beam through the output port toward a target,
   the module engagement interface further configured to enable the user to select a non-aligned configuration of the x-ray source module and the pencil-beam-forming module, wherein, in the non-aligned configuration, the pencil-beam-forming module is not aligned with the x-ray source module to receive the source x-rays at the input port nor to output the scanning pencil beam, the non-aligned configuration enabling the output source x-rays to form a stationary, wide-area beam directed toward the target.

2. The x-ray imaging apparatus of claim 1, wherein the module engagement interface includes complementary attachment features on the pencil-beam-forming module and the x-ray source module that are configured to permit the pencil-beam-forming module and the x-ray source module to be attached to each other in the aligned configuration and detached from each other in the non-aligned configuration.

3. The x-ray imaging apparatus of claim 2, wherein the complementary attachment features are mechanical latch, strap, snap, rivet, pin, or hook and loop fastener components.

4. The x-ray imaging apparatus of claim 2, wherein the complementary attachment features are magnets or a magnet and a magnetically susceptible material.

5. The x-ray imaging apparatus of claim 1, wherein the module engagement interface includes a rotational coupling between the pencil-beam-forming module and the x-ray source module.

6. The x-ray imaging apparatus of claim 1, wherein the module engagement interface includes a translational coupling between the pencil-beam-forming module and the x-ray source module.

7. The x-ray imaging apparatus of claim 1, wherein the module engagement interface is further configured to enable the user to select the aligned or non-aligned configuration via a manual manipulation by the user of the pencil-beam-forming module via the module engagement interface.

8. The x-ray imaging apparatus of claim 1, wherein the module engagement interface includes an electro-mechanical actuator that is configured to move the pencil-beam-forming module relative to the x-ray source module responsive to user selection of the aligned or non-aligned configuration.

9. The x-ray imaging apparatus of claim 1, further including handles configured to accommodate handheld operation.

10. The x-ray imaging apparatus of claim 1, further including robotic-platform-mounting features configured to couple the x-ray source module mechanically to a robotic platform for operation.

11. The x-ray imaging apparatus of claim 1, further including drone-mounting features configured to couple the x-ray source module mechanically to a drone for remote aerial operation.

12. The x-ray imaging apparatus of claim 1, further including a housing that fully or partially encompasses the x-ray source module and the pencil-beam-forming module, the housing including a first housing output port configured to output the scanning pencil beam in the aligned configuration, and the housing including a second housing output port configured to output the stationary, wide-area beam in the non-aligned configuration.

13. The x-ray imaging apparatus of claim 1, further including a backscatter detector that is configured to detect x-rays from the scanning pencil beam that are backscattered from the target.

14. The x-ray imaging apparatus of claim 13, wherein the backscatter detector forms part of the pencil-beam-forming module and is configured to remain fixedly attached to the pencil-beam-forming module in the aligned and non-aligned configurations.

15. An x-ray imaging system including the x-ray imaging apparatus of claim 13, further including a plurality of backscatter detectors that have different respective sizes and are selectively and interchangeably attachable to the x-ray source module or to the pencil-beam-forming module.

16. An x-ray imaging system including the x-ray imaging apparatus of claim 1, the system further including a pixelated detector configured to receive x-rays that are transmitted through the target from the stationary, wide-area beam.

17. An x-ray imaging apparatus comprising:
a beam-forming module configured to output x-rays from an x-ray source forming part of the beam-forming module, selectively, in a scanning-pencil-beam format and in a stationary, wide-area beam format.

18. A method of x-ray imaging comprising:
selectively forming, at a beam-forming module, using x-rays from an x-ray source forming part of the beam-forming module, an x-ray beam in a scanning-pencil-beam format; and
selectively forming, at the beam-forming module, using x-rays from the x-ray source, an x-ray beam in a stationary, wide-area beam format.

19. The method of x-ray imaging of claim 18, wherein the beam-forming module further includes a pencil-beam-forming module, and wherein selectively forming the x-ray beam in the scanning-pencil-beam format includes aligning an input port of the pencil-beam-forming module with the x-ray source to receive the source x-rays at the input port.

20. The method of x-ray imaging of claim 18, wherein the beam-forming module further includes a pencil-beam-forming module, wherein selectively forming the stationary, wide-area beam includes mechanically displacing an input port of the pencil-beam forming module with respect to the x-ray source such that the input port of the pencil-beam-forming module is not aligned to receive the source x-rays at the input port.

21. The method of x-ray imaging of claim 18, further comprising:
scanning the x-ray beam in the scanning-pencil-beam format over a first target; and
irradiating the first target or a second target with the x-ray beam in the stationary, wide-area beam format.

22. An apparatus for x-ray imaging comprising:
means for selectively forming, at a beam-forming module, using x-rays from an x-ray source forming part of the beam-forming module, an x-ray beam in a scanning-pencil-beam format; and
means for selectively forming, at the beam-forming module, using x-rays from the x-ray source, an x-ray beam in a stationary, wide-area beam format.

23. An x-ray imaging apparatus comprising:
an x-ray source module configured to output source x-rays; and
an x-ray beam mode selection interface configured to enable a user to select a scanning, pencil-beam-forming mechanical arrangement that is configured to form the source x-rays into a scanning pencil beam and to select, alternatively, a stationary, wide-area x-ray-beam-forming mechanical arrangement that is configured to form the source x-rays into a stationary, wide-area x-ray beam.

* * * * *